United States Patent
Gleeson-May et al.

(10) Patent No.: US 10,503,990 B2
(45) Date of Patent: *Dec. 10, 2019

(54) SYSTEM AND METHOD FOR DETERMINING PROBABILITY THAT A VEHICLE DRIVER IS ASSOCIATED WITH A DRIVER IDENTIFIER

(71) Applicant: Nauto, Inc., Palo Alto, CA (US)

(72) Inventors: Michael Gleeson-May, Palo Alto, CA (US); Frederick Soo, Palo Alto, CA (US); Stefan Heck, Palo Alto, CA (US)

(73) Assignee: Nauto, Inc., Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/160,809

(22) Filed: Oct. 15, 2018

(65) Prior Publication Data

US 2019/0050657 A1 Feb. 14, 2019

Related U.S. Application Data

(63) Continuation of application No. 15/642,094, filed on Jul. 5, 2017, now Pat. No. 10,133,942.

(Continued)

(51) Int. Cl.
*H04N 7/18* (2006.01)
*G06K 9/00* (2006.01)
(Continued)

(52) U.S. Cl.
CPC .......... *G06K 9/00845* (2013.01); *B60R 25/25* (2013.01); *G06K 9/00268* (2013.01);
(Continued)

(58) Field of Classification Search
CPC . B60R 25/25; G06K 9/00268; G06K 9/00845
See application file for complete search history.

(56) References Cited

U.S. PATENT DOCUMENTS 5,584,035 A 12/1996 Duggan et al.
5,638,116 A 6/1997 Shimoura et al.
(Continued)

FOREIGN PATENT DOCUMENTS

DE 102009005730 A1 7/2010
EP 3057061 B1 8/2017
(Continued)

OTHER PUBLICATIONS

"Which P&C Insurers Have Filed Patents Related to Autonomous Vehicles", Dec. 14, 2016, https://www.cbinsights.com/research/autonomous-vehicle-insurance-patents/?ReillyBrennanFoT, downloaded from the internet on Sep. 4, 2018.

(Continued)

*Primary Examiner* — Jessica M Prince

(74) *Attorney, Agent, or Firm* — Perkins Coie LLP; Michael A. Glenn

(57) ABSTRACT

A method for driver identification including recording a first image of a vehicle driver; extracting a set of values for a set of facial features of the vehicle driver from the first image; determining a filtering parameter; selecting a cluster of driver identifiers from a set of clusters, based on the filtering parameter; computing a probability that the set of values is associated with each driver identifier of the cluster; determining, at the vehicle sensor system, driving characterization data for the driving session; and in response to the computed probability exceeding a first threshold probability: determining that the new set of values corresponds to one driver identifier within the selected cluster, and associating the driving characterization data with the one driver identifier.

19 Claims, 12 Drawing Sheets

Related U.S. Application Data

(60) Provisional application No. 62/358,390, filed on Jul. 5, 2016, provisional application No. 62/383,930, filed on Sep. 6, 2016, provisional application No. 62/415,086, filed on Oct. 31, 2016.

(51) Int. Cl.
    *B60R 25/25*      (2013.01)
    *G06K 9/46*      (2006.01)

(52) U.S. Cl.
    CPC ..... *G06K 9/00281* (2013.01); *G06K 9/00288* (2013.01); *G06K 9/00979* (2013.01); *G06K 9/4642* (2013.01)

(56) References Cited

U.S. PATENT DOCUMENTS

| | | |
|---|---|---|
| 5,642,106 A | 6/1997 | Hancock et al. |
| 5,798,949 A | 8/1998 | Kaub |
| 5,898,390 A | 4/1999 | Oshizawa et al. |
| 5,961,571 A | 10/1999 | Gorr et al. |
| 6,018,728 A | 1/2000 | Spence et al. |
| 6,240,367 B1 | 5/2001 | Lin |
| 6,480,784 B2 | 11/2002 | Mizuno |
| 6,496,117 B2 | 12/2002 | Gutta et al. |
| 6,502,033 B1 | 12/2002 | Phuyal |
| 6,552,141 B1 | 4/2003 | Chmelir et al. |
| 6,662,141 B2 | 12/2003 | Kaub |
| 6,720,920 B2 | 4/2004 | Breed et al. |
| 6,927,694 B1 | 8/2005 | Smith et al. |
| 7,085,637 B2 | 8/2006 | Breed et al. |
| 7,148,913 B2 | 12/2006 | Keaton et al. |
| 7,195,394 B2 | 3/2007 | Singh |
| 7,212,651 B2 | 5/2007 | Viola et al. |
| 7,421,321 B2 | 9/2008 | Breed et al. |
| 7,423,540 B2 | 9/2008 | Kisacanin |
| 7,460,940 B2 | 12/2008 | Larsson et al. |
| 7,471,929 B2 | 12/2008 | Fujioka et al. |
| 7,502,677 B2 | 3/2009 | Weichenberger et al. |
| 7,502,688 B2 | 3/2009 | Hirokawa |
| 7,551,093 B2 | 6/2009 | Maass |
| 7,558,672 B2 | 7/2009 | Egami et al. |
| 7,639,148 B2 | 12/2009 | Victor |
| 7,646,922 B2 | 1/2010 | Au et al. |
| 7,844,077 B2 | 11/2010 | Kochi et al. |
| 7,853,072 B2 | 12/2010 | Han et al. |
| 7,868,821 B2 | 1/2011 | Hoshizaki |
| 7,912,288 B2 | 3/2011 | Winn et al. |
| 7,954,587 B2 | 6/2011 | Kisanuki et al. |
| 7,974,748 B2 | 7/2011 | Goerick et al. |
| 8,022,831 B1 | 9/2011 | Wood-Eyre |
| 8,114,568 B2 | 2/2012 | Van et al. |
| 8,174,568 B2 | 5/2012 | Samarasekera et al. |
| 8,195,394 B1 | 6/2012 | Zhu et al. |
| 8,254,670 B2 | 8/2012 | Prokhorov |
| 8,266,132 B2 | 9/2012 | Ofek et al. |
| 8,301,344 B2 | 10/2012 | Simon et al. |
| 8,344,849 B2 | 1/2013 | Larsson et al. |
| 8,369,608 B2 | 2/2013 | Gunaratne |
| 8,447,519 B2 | 5/2013 | Basnayake et al. |
| 8,487,775 B2 | 7/2013 | Victor et al. |
| 8,498,813 B2 | 7/2013 | Oohashi et al. |
| 8,510,196 B1 | 8/2013 | Brandmaier et al. |
| 8,594,920 B2 | 11/2013 | Shida |
| 8,606,492 B1 | 12/2013 | Botnen |
| 8,619,135 B2 | 12/2013 | Shellshear et al. |
| 8,654,151 B2 | 2/2014 | Kim |
| 8,666,644 B2 | 3/2014 | Goto |
| 8,676,498 B2 | 3/2014 | Ma et al. |
| 8,744,642 B2 | 6/2014 | Nemat-Nasser et al. |
| 8,761,439 B1 | 6/2014 | Kumar et al. |
| 8,805,707 B2 | 8/2014 | Schumann et al. |
| 8,854,199 B2 | 10/2014 | Cook et al. |
| 8,934,709 B2 | 1/2015 | Saptharishi et al. |
| 8,952,819 B2 | 2/2015 | Nemat-Nasser |
| 9,019,571 B2 | 4/2015 | Yamada |
| 9,053,554 B2 | 6/2015 | Uchida et al. |
| 9,079,571 B2 | 7/2015 | Trost et al. |
| 9,081,650 B1 | 7/2015 | Brinkmann et al. |
| 9,111,147 B2 | 8/2015 | Thornton et al. |
| 9,121,713 B2 | 9/2015 | Samarasekera et al. |
| 9,146,558 B2 | 9/2015 | Field et al. |
| 9,158,962 B1 | 10/2015 | Nemat-Nasser et al. |
| 9,180,887 B2 | 11/2015 | Nemat-Nasser et al. |
| 9,201,424 B1 | 12/2015 | Ogale |
| 9,201,932 B2 | 12/2015 | Silver et al. |
| 9,235,750 B1 | 1/2016 | Sutton et al. |
| 9,305,214 B1 | 4/2016 | Young et al. |
| 9,327,743 B2 | 5/2016 | Green et al. |
| 9,330,571 B2 | 5/2016 | Ferguson et al. |
| 9,349,113 B2 | 5/2016 | Bashkin |
| 9,358,976 B2 | 6/2016 | Stierlin |
| 9,412,102 B2 | 8/2016 | Wolf et al. |
| 9,429,439 B2 | 8/2016 | Stümper |
| 9,439,036 B2 | 9/2016 | Spears et al. |
| 9,465,978 B2 | 10/2016 | Hachisuka et al. |
| 9,472,102 B2 | 10/2016 | McClain et al. |
| 9,491,374 B1 | 11/2016 | Avrahami et al. |
| 9,514,626 B2 | 12/2016 | Wu et al. |
| 9,535,878 B1 | 1/2017 | Brinkmann et al. |
| 9,573,541 B2 | 2/2017 | Graumann et al. |
| 9,679,480 B2 | 6/2017 | Hakeem |
| 9,688,150 B2 | 6/2017 | Seong et al. |
| 9,701,307 B1 | 7/2017 | Newman et al. |
| 9,718,468 B2 | 8/2017 | Barfield et al. |
| 9,731,727 B2 | 8/2017 | Heim et al. |
| 9,734,414 B2 | 8/2017 | Samarasekera et al. |
| 9,734,455 B2 | 8/2017 | Levinson et al. |
| 9,767,625 B1 | 9/2017 | Snyder et al. |
| 9,812,016 B2 | 11/2017 | Oremus |
| 9,845,097 B2 | 12/2017 | Prakah-Asante et al. |
| 9,851,214 B1 | 12/2017 | Chintakindi |
| 9,852,019 B2 | 12/2017 | Ashani |
| 9,881,218 B2 | 1/2018 | Ogata et al. |
| 9,892,558 B2 | 2/2018 | Troy et al. |
| 9,928,432 B1 | 3/2018 | Sathyanarayana et al. |
| 9,977,973 B2 | 5/2018 | Okuda et al. |
| 2001/0018636 A1 | 8/2001 | Mizuno |
| 2002/0082806 A1 | 6/2002 | Kaub |
| 2002/0198632 A1 | 12/2002 | Breed et al. |
| 2003/0095140 A1 | 5/2003 | Keaton et al. |
| 2003/0169907 A1 | 9/2003 | Edwards et al. |
| 2004/0051659 A1 | 3/2004 | Garrison |
| 2004/0167667 A1 | 8/2004 | Goncalves et al. |
| 2004/0168148 A1 | 8/2004 | Goncalves et al. |
| 2004/0258307 A1 | 12/2004 | Viola et al. |
| 2005/0002558 A1 | 1/2005 | Franke et al. |
| 2005/0073136 A1 | 4/2005 | Larsson et al. |
| 2005/0182518 A1 | 8/2005 | Karlsson |
| 2005/0234679 A1 | 10/2005 | Karlsson |
| 2006/0106534 A1 | 5/2006 | Kawamata et al. |
| 2006/0186702 A1 | 8/2006 | Kisanuki et al. |
| 2006/0247847 A1 | 11/2006 | Carter et al. |
| 2006/0271287 A1 | 11/2006 | Gold et al. |
| 2007/0050108 A1 | 3/2007 | Larschan et al. |
| 2007/0063855 A1 | 3/2007 | Maass |
| 2007/0100669 A1 | 5/2007 | Wargin et al. |
| 2007/0120948 A1 | 5/2007 | Fujioka et al. |
| 2007/0154100 A1 | 7/2007 | Au et al. |
| 2007/0159344 A1 | 7/2007 | Kisacanin |
| 2007/0244640 A1 | 10/2007 | Hirokawa |
| 2008/0025568 A1 | 1/2008 | Han et al. |
| 2008/0075367 A1 | 3/2008 | Winn et al. |
| 2008/0084283 A1 | 4/2008 | Kalik |
| 2008/0243378 A1 | 10/2008 | Zavoli |
| 2008/0252412 A1* | 10/2008 | Larsson ............... B60R 25/25 340/5.2 |
| 2009/0080697 A1 | 3/2009 | Kishikawa et al. |
| 2009/0244291 A1 | 10/2009 | Saptharishi et al. |
| 2010/0061591 A1 | 3/2010 | Okada et al. |
| 2010/0169013 A1 | 7/2010 | Nakamura et al. |
| 2010/0209881 A1 | 8/2010 | Lin et al. |
| 2010/0215254 A1 | 8/2010 | Prokhorov |

(56) References Cited

U.S. PATENT DOCUMENTS

| | | |
|---|---|---|
| 2010/0225665 A1 | 9/2010 | Ofek et al. |
| 2010/0238009 A1 | 9/2010 | Cook et al. |
| 2010/0312745 A1 | 12/2010 | Tabak |
| 2011/0128374 A1 | 6/2011 | Shellshear et al. |
| 2011/0262004 A1 | 10/2011 | Murakami |
| 2012/0027258 A1 | 2/2012 | Uchida et al. |
| 2012/0116676 A1 | 5/2012 | Basnayake et al. |
| 2012/0123806 A1 | 5/2012 | Schumann et al. |
| 2012/0154425 A1 | 6/2012 | Kim |
| 2012/0185091 A1 | 7/2012 | Field et al. |
| 2012/0197519 A1 | 8/2012 | Richardson |
| 2012/0206596 A1 | 8/2012 | Samarasekera et al. |
| 2012/0263346 A1 | 10/2012 | Datta et al. |
| 2013/0073114 A1* | 3/2013 | Nemat-Nasser ...... B60W 40/09 701/1 |
| 2013/0093886 A1 | 4/2013 | Rothschild |
| 2013/0142390 A1 | 6/2013 | Othmezouri et al. |
| 2013/0147661 A1 | 6/2013 | Kangas et al. |
| 2013/0155229 A1 | 6/2013 | Thornton et al. |
| 2013/0194127 A1 | 8/2013 | Ishihara et al. |
| 2013/0211687 A1 | 8/2013 | Trost et al. |
| 2014/0037138 A1 | 2/2014 | Sato et al. |
| 2014/0049601 A1 | 2/2014 | Pfeil |
| 2014/0139655 A1 | 5/2014 | Mimar |
| 2014/0193781 A1* | 7/2014 | Sands .................. G09B 19/167 434/64 |
| 2014/0195477 A1* | 7/2014 | Graumann ......... G06K 9/00369 707/609 |
| 2014/0210978 A1 | 7/2014 | Gunaratne et al. |
| 2014/0213300 A1 | 7/2014 | Spears et al. |
| 2014/0214255 A1 | 7/2014 | Dolgov et al. |
| 2014/0267703 A1 | 9/2014 | Taylor et al. |
| 2014/0324281 A1 | 10/2014 | Nemat-Nasser et al. |
| 2014/0379233 A1 | 12/2014 | Chundrlik et al. |
| 2015/0025917 A1 | 1/2015 | Stempora |
| 2015/0049195 A1 | 2/2015 | Ishigaki et al. |
| 2015/0078632 A1 | 3/2015 | Hachisuka et al. |
| 2015/0084757 A1 | 3/2015 | Annibale et al. |
| 2015/0086078 A1 | 3/2015 | Sibiryakov |
| 2015/0110344 A1 | 4/2015 | Okumura |
| 2015/0140991 A1 | 5/2015 | Silver et al. |
| 2015/0161892 A1 | 6/2015 | Oremus |
| 2015/0219462 A1 | 8/2015 | Stmper |
| 2015/0221136 A1 | 8/2015 | Shaburova et al. |
| 2015/0239482 A1 | 8/2015 | Green et al. |
| 2015/0254603 A1 | 9/2015 | Bashkin |
| 2015/0269438 A1 | 9/2015 | Samarasekera et al. |
| 2015/0294422 A1 | 10/2015 | Carver et al. |
| 2015/0344030 A1 | 12/2015 | Damerow et al. |
| 2015/0375756 A1 | 12/2015 | Do et al. |
| 2015/0379715 A1 | 12/2015 | Chandrasekar et al. |
| 2016/0046298 A1* | 2/2016 | DeRuyck .............. B60W 40/09 340/576 |
| 2016/0063761 A1 | 3/2016 | Sisbot et al. |
| 2016/0078303 A1 | 3/2016 | Samarasekera et al. |
| 2016/0086021 A1 | 3/2016 | Grohman et al. |
| 2016/0139977 A1 | 5/2016 | Ashani |
| 2016/0147230 A1 | 5/2016 | Munich et al. |
| 2016/0163198 A1 | 6/2016 | Dougherty |
| 2016/0169690 A1 | 6/2016 | Bogovich et al. |
| 2016/0203373 A1 | 7/2016 | Menashe et al. |
| 2016/0209511 A1 | 7/2016 | Dolinar et al. |
| 2016/0244022 A1 | 8/2016 | Lippman et al. |
| 2016/0253806 A1 | 9/2016 | Iimura |
| 2016/0253886 A1 | 9/2016 | Buchholz et al. |
| 2016/0267335 A1 | 9/2016 | Hampiholi |
| 2016/0284078 A1 | 9/2016 | Kim et al. |
| 2016/0297365 A1 | 10/2016 | Nix |
| 2016/0300242 A1 | 10/2016 | Truong et al. |
| 2016/0305794 A1 | 10/2016 | Horita et al. |
| 2016/0335475 A1 | 11/2016 | Krenzer et al. |
| 2016/0339782 A1 | 11/2016 | Seong et al. |
| 2017/0011529 A1 | 1/2017 | Urashita |
| 2017/0039848 A1 | 2/2017 | Hakeem |
| 2017/0039850 A1 | 2/2017 | Vanden Berg et al. |
| 2017/0043781 A1 | 2/2017 | Prakah-Asante et al. |
| 2017/0048239 A1 | 2/2017 | Jeon et al. |
| 2017/0053167 A1 | 2/2017 | Ren et al. |
| 2017/0053555 A1* | 2/2017 | Angel .................. G09B 19/167 |
| 2017/0055868 A1 | 3/2017 | Hatakeyama |
| 2017/0061222 A1 | 3/2017 | Hoye et al. |
| 2017/0064363 A1 | 3/2017 | Wexler et al. |
| 2017/0080900 A1 | 3/2017 | Huennekens et al. |
| 2017/0088142 A1 | 3/2017 | Hunt et al. |
| 2017/0089710 A1 | 3/2017 | Slusar |
| 2017/0098131 A1 | 4/2017 | Shashua et al. |
| 2017/0106869 A1 | 4/2017 | Lavoie et al. |
| 2017/0109828 A1 | 4/2017 | Pierce et al. |
| 2017/0113664 A1 | 4/2017 | Nix |
| 2017/0124476 A1 | 5/2017 | Levinson et al. |
| 2017/0140231 A1 | 5/2017 | Chen et al. |
| 2017/0146801 A1 | 5/2017 | Stempora |
| 2017/0178352 A1 | 6/2017 | Harmsen et al. |
| 2017/0200061 A1 | 7/2017 | Julian et al. |
| 2017/0217444 A1* | 8/2017 | Chaston ............... B60W 50/08 |
| 2017/0221149 A1 | 8/2017 | Hsu-Hoffman et al. |
| 2017/0248952 A1 | 8/2017 | Perkins et al. |
| 2017/0253236 A1 | 9/2017 | Hayakawa |
| 2017/0287163 A1 | 10/2017 | Kaufmann et al. |
| 2017/0292848 A1 | 10/2017 | Nepomuceno et al. |
| 2017/0293819 A1 | 10/2017 | Deng |
| 2017/0309072 A1 | 10/2017 | Li et al. |
| 2017/0345161 A1 | 11/2017 | Takatani et al. |
| 2017/0357861 A1 | 12/2017 | Okuda et al. |
| 2018/0012085 A1 | 1/2018 | Blayvas et al. |
| 2018/0039862 A1 | 2/2018 | Hyatt et al. |
| 2018/0045519 A1 | 2/2018 | Ghadiok et al. |
| 2018/0052515 A1 | 2/2018 | Wanner et al. |
| 2018/0075309 A1 | 3/2018 | Sathyanarayana et al. |
| 2018/0107882 A1 | 4/2018 | Ogata et al. |
| 2018/0115711 A1 | 4/2018 | Kato et al. |
| 2018/0172454 A1 | 6/2018 | Ghadiok et al. |
| 2018/0176173 A1 | 6/2018 | Keysers et al. |
| 2018/0186366 A1 | 7/2018 | Gordon et al. |
| 2018/0204111 A1 | 7/2018 | Zadeh et al. |
| 2018/0229770 A1 | 8/2018 | Kataoka et al. |
| 2018/0232583 A1 | 8/2018 | Wang et al. |
| 2018/0239144 A1 | 8/2018 | Woods |
| 2018/0259353 A1 | 9/2018 | Tsurumi et al. |

FOREIGN PATENT DOCUMENTS

| | | |
|---|---|---|
| GB | 2506365 A | 4/2014 |
| WO | 2015184578 A1 | 12/2015 |
| WO | 2016135561 A1 | 9/2016 |
| WO | 2018039560 A1 | 3/2018 |

OTHER PUBLICATIONS

Guo Feng: et al. "Task 3-Evaluating the Relationship Between Near-Crashes and Crashes: Can Near-Crashes Serve as a Surrogate Safety Metric for Crashes?" Virginia Tech Transportation Institute, U.S. Department of Transportation, Sep. 2010., Nov. 6, 2017.

* cited by examiner

SYSTEM AND METHOD FOR DETERMINING PROBABILITY THAT A VEHICLE DRIVER IS ASSOCIATED WITH A DRIVER IDENTIFIER

CROSS-REFERENCE TO RELATED APPLICATIONS

This application is a continuation of U.S. application Ser. No. 15/624,094, filed 5 Jul. 2017, now U.S. Pat. No. 10,133,942, which claims the benefit of U.S. Provisional Application Ser. No. 62/415,086, filed 31 Oct. 2016, and U.S. Provisional Application Ser. No. 62/383,930, filed 6 Sep. 2016, and U.S. Provisional Application Ser. No. 62/358,390, filed 5 Jul. 2016, which are each incorporated herein in their entirety by this reference.

TECHNICAL FIELD

This invention relates generally to the automotive field, and more specifically to a new and useful system and method for driver identification in the automotive field.

BACKGROUND

Insurance companies and fleet operators have little visibility into driver performance over time. While they can manually monitor for a short period of time, the high overhead required to closely monitor the drivers for an extended period renders extended monitoring impracticable. This inability to perform long-term driver monitoring can become an issue because, as the inventors have discovered, poor driving behaviors tend to emerge after the initial monitoring period ("grace period"), and these poor driving behaviors can be responsible for a large number of accidents or near accidents.

As such, automated driver performance tracking over time can provide great value to these entities. However, reliable driver identification poses a great challenge, since conventional systems can be easily thwarted. With the onset of car sharing and distributed fleets, the vehicle's identifier is no longer a reliable unique driver identifier, since a single vehicle can be used by multiple drivers. In a specific example, given vehicle can be shared by 10-20 different drivers within a fleet. Dispatchers (e.g., digital or manual) can also fail as reliable driver identifiers. Manual dispatchers require a large amount of overhead, and may misidentify drivers. Digital dispatchers can be easily thwarted because the driver identifier is tied to the user account on the user device; a driver can simply use a different driver's user device or account. Similarly, user devices can also fail as reliable unique identifiers, since they require the driver to install the application, keep the user device on, run the application, and use own cellular data to upload information. This multi-step process can raise a barrier to user adoption and use. Auxiliary hardware (e.g., dongle, RFID, beacon, etc.) can also fail as a reliable driver identifier, since they are easily stolen or replicated.

Thus, there is a need in the automotive field to create a new and useful system and method for reliable driver identification. This invention provides such new and useful system and method.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
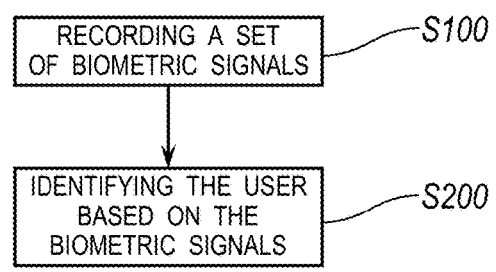
FIG. 1 is a schematic representation of the method for automatic driver identification.

As shown in FIG. 1, the method 100 for driver identification includes: recording a set of biometric signals S100; and, identifying the user based on the biometric signals S200. The method functions to identify the driver of a vehicle for a driving session.

In one variation of the method, recording a set of biometric signals and identifying the user from a predetermined user set can include: recording a set of images (e.g., image sequence, sequence of images) in response to detection of user proximity to a vehicle, detecting a face within the image, extracting feature values from the detected face, and determining a driver identifier for a driver selected from a set of drivers based on the feature values. Filtering parameters, such as characteristic auxiliary sensor signal patterns or combinations, schedules, habits (e.g., frequent user-vehicle associations), or other parameters can be used to: reduce the set of drivers considered for feature value analysis, select a user from a reduced set of drivers after feature value analysis, or otherwise used to identify the driver. However, other biometric signals can be recorded, and the user can be otherwise determined based on biometric signals.

The determined user identifier (driver identifier, passenger identifier) can be used in a variety of applications.

In a first application, the user identifier is used for insurance purposes. In a first example of this first application, auxiliary sensor signals associated with the driving session and/or characterizations derived from the auxiliary sensor signals (e.g., driver sobriety, cautiousness, etc.) can be associated with a driving history associated with the user identifier. This driving history can subsequently be used to determine insurance premiums, insurability, or otherwise used. In a second example of this first application, the user identifier can be used to identify the driver in a vehicle accident (e.g., collision). In this example, auxiliary sensor signals (e.g., audio measurements, secondary camera streams, etc.) can additionally be used to detect vehicle accidents, determine fault in the accident, or used in any other suitable manner.

In a second application, the user identifier is used for fleet management purposes. In a first example of this second application, the user identifier can be associated with a timestamp (e.g., for the driving session or driving event). This information can be used to determine the driver's payroll (e.g., to determine whether and how long the driver was driving), to determine liability (e.g., wherein vehicle damage or a vehicle accident occurs during the driving session), to track items or objects, to determine a driving profile (e.g., wherein the user identifier is associated with characterizations or sensor signals recorded during the driving session for the vehicle), for dispatch (e.g., wherein a slower driver is dispatched to a passenger with health problems, a faster driver is dispatched to a passenger that is historically in a rush, etc.), or otherwise used. In a second example of this second application, the user identifier can be associated with a set of locations (e.g., pickup location, route, end location, etc.). This information can be used to verify driver reports, subsequently used as a filtering parameter, or otherwise used. In a third example of this second application, the user identifier can be associated with a vehicle identifier (e.g., uniquely identifying the individual vehicle). This information can be used to confirm scheduled user use of the vehicle, determine which user to assign liability to (e.g., when vehicle damage is subsequently discovered), subsequently used as a filtering parameter, or otherwise used. However, the user identifier can be otherwise used for fleet management purposes.

In a third application, the user identifier can be used for vehicle access purposes. For example, vehicle operation can be locked or suspended (e.g., by the system) until the user identifier matches a permitted user (e.g., a driver scheduled for vehicle use, a fleet driver, etc.). However, the user identifier can be otherwise used for vehicle access purposes.

In a fourth application, the user identifier and associated driving session information (e.g., sensor signals recorded during the driving session) can be subsequently used to perform driver analyses (e.g., determine a driver score).

However, the user identifier can be used in any other suitable application.

2. Benefits

The system and method can confer several benefits over conventional systems. First, by directly measuring user presence, the system and method can present more reliable user identification and user association with a driving session or other set of data. This information can be used to detect driver and/or passenger presence in the vehicle, which can be used to confirm that the correct number of people are in the vehicle, or be used in any other suitable manner.

Second, the system and method can minimize user fraud by using biometric data as a unique identifier for the user. This information can be used to identify the driver and/or passenger in the vehicle, which can subsequently be used to log user hours (e.g., driver hours), verify that the correct driver and/or passenger is in the car for the given driving session, provide vehicle lock-out for unauthorized drivers, notify vehicle managers of unauthorized use, or be used in any other suitable manner.

Third, the system and method can automatically update the biometric database by identifying new users to the system (e.g., users without information in the biometric database, users without facial images, etc.), recording biometric information for the new user, processing the biometric information to extract biometric parameter values, and adding new users to the system by adding the biometric parameter values to the database. The system and method can additionally or alternatively automatically update (e.g., train) the biometric data processing modules, the user identification modules, the population processing modules, or any other suitable module.

Fourth, variants of this system can optimize user identification (e.g., speed, accuracy, etc.) given constrained local processing power, memory, upload bandwidth, latency, and other resources. For example, biometric driver identification can be more accurate and/or faster by using multiple samples recorded over the course of a driving session, leveraging a strong prior that there is a low probability of drivers changing while the vehicle is moving. In a second example the number of biometric samples can be dynamically adjusted based on the driver identification confidence. This can decrease the sampling rate, which decreases system resource consumption (e.g., power consumption, processing power consumption) and saves bandwidth (e.g., when the samples are transmitted to a remote computing system for processing). In a third example, the rejection ratios (e.g., for sample rejection, potential driver identity rejection, driver identification confidence threshold, etc.) can be dynamically set based on entity parameters, driving context, or other parameter. In a specific example, small fleets can have a high false positive ratio or rate (or low false negative rate), while large fleets can have a low false positive ratio or rate (or high false negative rate), which allows the system to save computing resources on small fleets that can be easily manually triaged. In a fourth example, the system can allow a management entity (e.g., fleet manager) to manually inspect and modify (e.g., split, merge, etc.) the data structure (e.g., clusters of similar faces).

However, the system and method can confer any other suitable set of benefits.

3. System.

Figure 2:
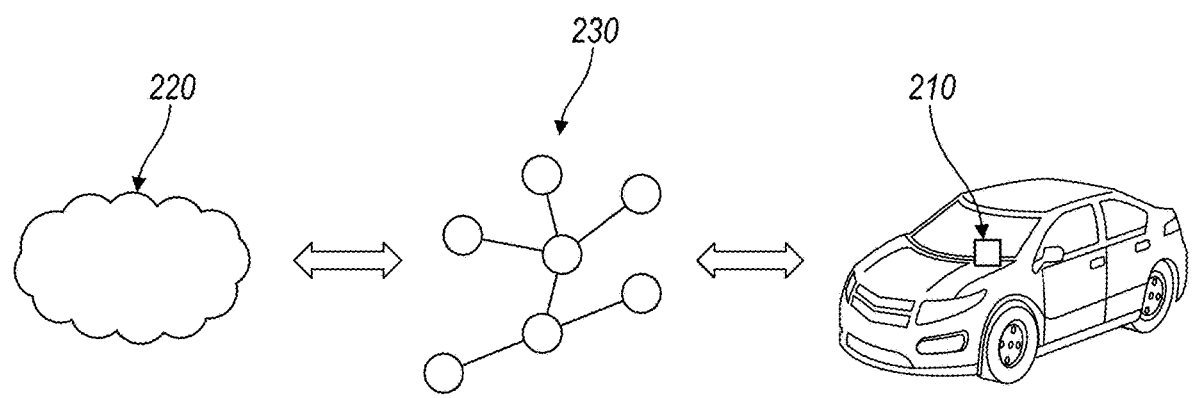
FIG. 2 is a schematic representation of a system for automatic driver identification.

As shown in FIG. 2, the system 200 can include: a vehicle system 210, a remote computing system 220, and a set of analysis modules 230. The system can optionally include: a user client, a management client, or any other suitable client configured to run on a user device 240. However, the system can include any other suitable component. The system 200 can be operable between one or more modes. For example, the system can be operable between a passive mode with long identification latency (e.g., longer than a few seconds, which can be useful for insurance scoring or new driver identification), and an active mode with short identification latency (e.g., within a few seconds, which can be useful for vehicle security or unknown driver alerts). The operation mode can be selected: automatically, manually, dynamically (e.g., based on the operation or driving context), statically (e.g., based on the entity using the system 200), or otherwise determined.

Figure 4:
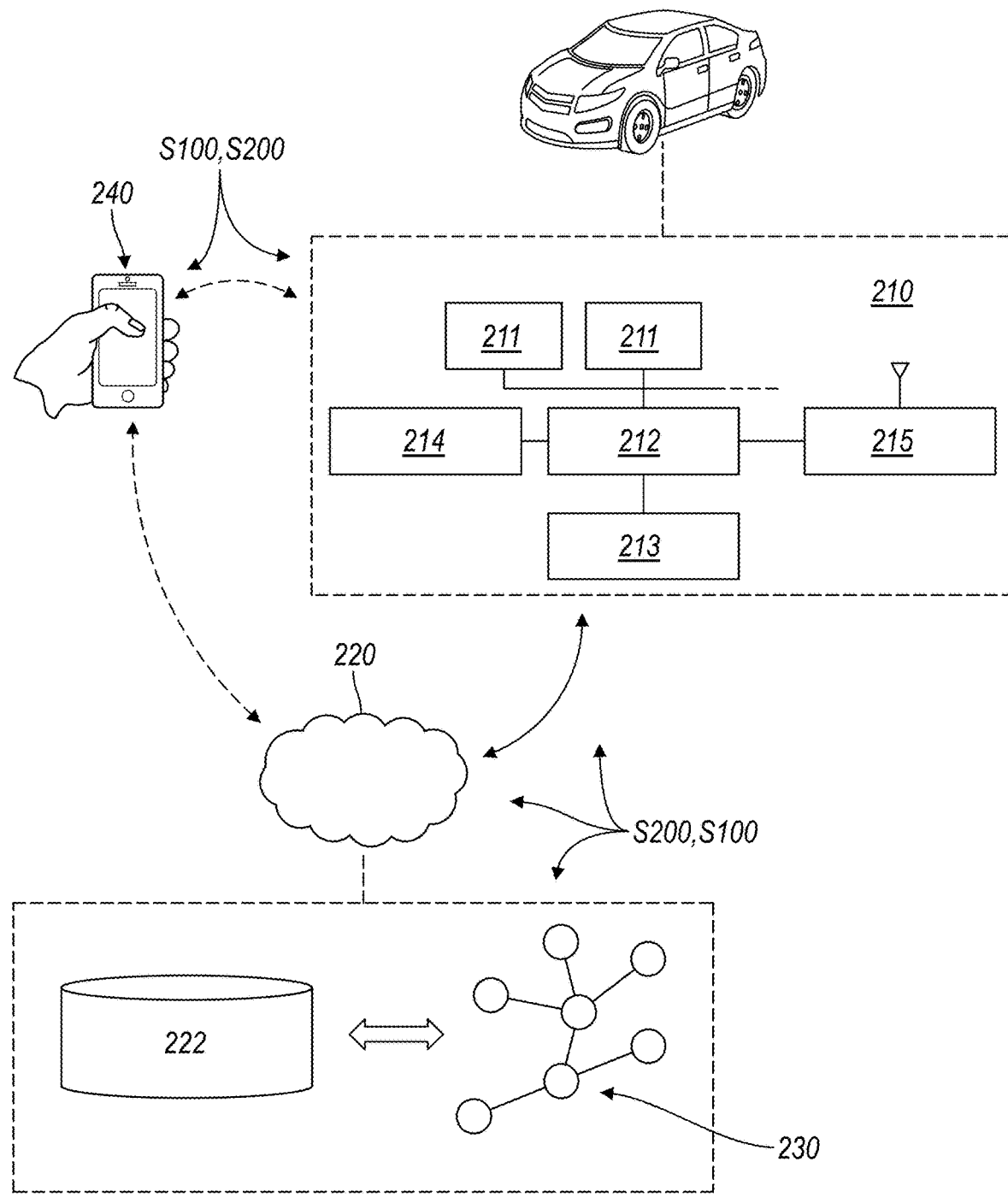
FIG. 4 is a schematic representation of a variation of the system.

The vehicle system (e.g., vehicle sensor system) functions to record sensor signals indicative of biometric parameters, and can optionally: uniquely identify a vehicle, store data associated with the vehicle (e.g., feature values for frequent drivers of the vehicle, clusters for vehicle drivers, vehicle operation logs, etc.), process the sensor signals into feature values, or perform any other suitable functionality. As shown in FIG. 4, the vehicle system can include: a set of sensors 211, a processing system 212, memory 213, a power supply 214, a communication system 215, outputs 216, location systems, or any other suitable component.

The sensors of the vehicle system function to acquire signals indicative of biometric data. The sensors can additionally or alternatively acquire signals over the course of a driving session, acquire signals indicative of user proximity to the vehicle and/or vehicle system, or record any other suitable set of signals. The sensor signals can be timestamped (e.g., with the sampling time), geotagged, associated with the vehicle system identifier, associated with the user identifier, associated with the vehicle identifier, or associated with any suitable set of data. The sensor signals can be immediately analyzed and discarded, stored temporarily on the vehicle system (e.g., cached), stored substantially permanently on the vehicle system, sent to the remote computing system or user device, streamed to the remote computing system or user device, or otherwise stored. The set of sensors can include: cameras (e.g., recording wavelengths within the visual range, multispectral, hyperspectral, IR, stereoscopic, wide-angle, wide dynamic range, etc.), orientation sensors (e.g., accelerometers, gyroscopes, altimeters), acoustic sensors (e.g., microphones), optical sensors (e.g., photodiodes, etc.), temperature sensors, pressure sensors, flow sensors, vibration sensors, proximity sensors, chemical sensors, electromagnetic sensors, force sensors, or any other suitable type of sensor. The vehicle system can include one or more sensors of same or differing type. In one variation, the vehicle system includes a camera, wherein the vehicle system is configured to mount to a vehicle interior such that the camera is directed with a field of view encompassing a portion of the vehicle interior, more preferably the volume associated with a driver's position but alternatively or additionally a different physical volume.

The sensors of the vehicle system (e.g., vehicle sensor system) can also function to acquire signals indicative of a driving session and/or driving operations (e.g., driving characterization data, vehicle operational data, driving session data, etc.). Driving characterization data and/or vehicle operational data can include vehicle outputs (e.g., engine output power, transmission gear state, throttle and/or accelerator pedal position, fuel injection parameters, voltage and/or current values of any vehicle components operating on electrical power, brake lever position, brake pedal position, brake caliper position, etc.), vehicle kinematics (e.g., acceleration, velocity, position, planned traversal path, current traversal path, past traversal path, etc.), vehicle inputs (e.g., accelerator pedal position, steering wheel position, gear shifter position, door position, such as open or closed, etc.), driver parameters (e.g., whether the driver is distracted or not, a distraction level of a distracted driver, a head position of a driver, etc.), vehicle cabin parameters (e.g., noise levels, number of passengers in the vehicle, etc.), and any other suitable data related to the operation of a vehicle.

Driving characterization data can also include driver behavior data (e.g., data from which driver actions and/or behaviors can be determined). In a first example, driver behavior data includes imagery data (e.g., a sequence of images) recorded by a vehicle sensor system of the driver of the vehicle during vehicle operation (e.g., a driving session). Driver behavior data can include data indicative of a driver distraction level, driving tendencies, and/or any other suitable data associated with behaviors of the driver.

The processing system of the vehicle system can function to perform the all or part of the analyses, control vehicle system operation (e.g., select the vehicle system operation mode), or perform any other suitable computational task. The processing system can be a CPU, GPU, microprocessor, tensor processing unit (TPU), or any other suitable processing unit. The memory can include volatile memory, non-volatile memory, optical memory, organic memory, or any other suitable computing memory.

The power supply of the vehicle system functions to power the active components of the vehicle system. The power supply can be a wired connection to the vehicle (e.g., an OBD port plug, connection to the vehicle bus, connection to the vehicle battery, etc.), wireless connection to the vehicle (e.g., inductive charger), a battery (e.g., secondary or rechargeable battery, primary battery, etc.), energy harvesting system (e.g., solar cells, piezoelectric systems, pyroelectrics, thermoelectrics, etc.), or any other suitable system.

The communication system of the vehicle system functions to communicate data between the vehicle system and the user device, the remote computing system, the vehicle, or any other suitable endpoint. The communication system can include one or more radios or any other suitable component. The communication system can be a long-range communication system, a short-range communication system, or any other suitable communication system. The communication system can facilitate wired and/or wireless communication. Examples of the communication system include: 802.11x, Wi-Fi, Wi-Max, WLAN, NFC, RFID, Bluetooth, Bluetooth Low Energy, BLE long range, ZigBee, cellular telecommunications (e.g., 2G, 3G, 4G, LTE, etc.), radio (RF), microwave, IR, audio, optical, wired connection (e.g., USB), or any other suitable communication module or combination thereof.

The output of the vehicle system functions to present data, emit signals, or otherwise output information. The outputs can include: displays (e.g., LED display, OLED display, LCD, etc.), audio speakers, lights (e.g., LEDs, white light emitters, red light emitters, IR light emitters, etc.), tactile outputs (e.g., a tixel system, vibratory motors, etc.), or any other suitable output.

The location system of the vehicle system functions to acquire a vehicle system location. The vehicle system location can be an absolute geographic location, a relative geographic location, or any other suitable physical or virtual location. The location system can include a GPS unit, a GNSS unit, a triangulation unit that triangulates the device location between mobile phone towers and public masts (e.g., assistive GPS), a Wi-Fi connection location unit, a WHOIS unit (e.g., performed on IP address or MAC address), a GSM/CDMA cell identifier, a self-reporting location information, or any other suitable location module.

The vehicle system can additionally include a housing, which functions to enclose, protect, and/or retain the vehicle system components. The housing can additionally define a mounting mechanism (e.g., clip, suction cup, magnet, etc.) configured to mount the vehicle system to a vehicle.

The vehicle system can be used with one or more vehicles, wherein the vehicle system can uniquely identify the vehicle that it is currently associated with. The vehicle system can additionally or alternatively store information associated with said vehicle. In a first variation, the vehicle system is specific to a single vehicle, and can be statically mounted to the vehicle (e.g., within the vehicle, outside of the vehicle, etc.). In a first embodiment, the vehicle system identifier is used as a proxy for the vehicle identifier. In a second embodiment, the vehicle system can store a vehicle identifier (e.g., license plate, VIN number, etc.). However, the vehicle system can otherwise uniquely identify and/or store information associated with the vehicle. In a second variation, the vehicle system can be associated with (e.g., used across) multiple vehicles, wherein the vehicle system can be removably coupled to the vehicles. In a first embodiment, the vehicle system can read (e.g., through the communication system) a vehicle identifier from the vehicle (e.g., through a connection to the vehicle bus, through an OBD port, from a vehicle RFID tag or beacon, etc.), from a mount statically mounted to the vehicle, or from any other suitable data source. In a second embodiment, the vehicle system can infer a vehicle identifier for the vehicle, based on sensor signals (e.g., location, ambient light, temperature, etc.). For example, the vehicle system can infer that it is associated with (e.g., located within) a vehicle when the measured location is substantially similar to (e.g., within a threshold distance of) the vehicle location (e.g., known or estimated, based on past driving history). However, the vehicle system can be otherwise associated with a set of vehicles.

The remote computing system of the system functions as a central management system for one or more vehicle systems, users, clients, or other entities. The remote computing system can optionally function as a repository (e.g., central repository) and store user information (e.g., biometric database, preferences, profiles, accounts, etc.), process the sensor signals, perform all or part of the analyses, or perform any other suitable computational task. The remote computing system is preferably remote from the vehicle system, but can alternatively be collocated with the vehicle system or otherwise arranged. The remote computing system can be a set of networked servers, a distributed computing system, or be any other suitable computing system. The remote computing system can be stateful, stateless, or have any other suitable configuration.

The analysis modules of the system function to determine a user identifier (e.g., identify a user) based on the sensor signals. The analysis modules can be entirely or partially stored on: the remote computing system, the user device(s), the vehicle system(s), or any other suitable computing system. The analysis modules can be centralized, decentralized, or otherwise configured. When stored on a remote repository (e.g., a repository remote from the central repository), the remote repositories can be updated at a predetermined frequency (e.g., every night, every hour, etc.), upon occurrence of a predetermined event (e.g., upon update generation, upon connection to a predetermined network type, such as connection to a WiFi network, connection to a user device with cellular data, etc.), or at any other suitable time.

In a first variation, the analysis modules can include a feature extraction module 231, configured to extract feature values from the sensor signal set (e.g., a decomposition module). In a second variation, the analysis modules can include a user identification module, configured to identify a user based on the set of extracted feature values. In a third variation, the analysis modules can include an object identification module, configured to identify an object type or class within a set of sensor signals (e.g., a face detection module 231' for image analysis). In a fourth variation, the analysis modules can include a sampling event module, configured to identify when sensor signals should be sampled or recorded. In a fifth variation, the analysis modules can include a clustering module 234, configured to cluster the feature values and/or vectors for each user of a population into a set of clusters. The cluster set can be global (e.g., applicable to multiple entities, such as multiple fleets), specific to an entity, or otherwise segmented). In a sixth variation, the analysis modules can include a calibration or training module, configured to retrain a second module (e.g., the clustering module, user identification module, etc.) based on new data (e.g., classification of an outlier or unknown user). However, the analysis modules can include any other suitable set of analysis modules. The system can include one or more analysis modules, run in parallel, series, or any suitable combination.

Each module of the plurality can utilize one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolutional network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and any suitable form of machine learning algorithm. Each module can additionally or alternatively be a: probabilistic module, heuristic module, deterministic module, or be any other suitable module leveraging any other suitable computation method, machine learning method, or combination thereof.

Each module can be validated, verified, reinforced, calibrated, or otherwise updated based on newly received, up-to-date measurements; past measurements recorded during the operating session; historic measurements recorded during past operating sessions; or be updated based on any other suitable data. Each module can be run or updated: once; at a predetermined frequency; every time the method is performed; every time an unanticipated measurement value is received; or at any other suitable frequency. The set of modules can be run or updated concurrently with one or more other modules, serially, at varying frequencies, or at any other suitable time. Each module can be validated, verified, reinforced, calibrated, or otherwise updated based on newly received, up-to-date data; past data; or be updated based on any other suitable data. Each module can be run or updated: in response to determination of an actual result differing from an expected result; or at any other suitable frequency.

The system can additionally include a set of user databases 222, which function to store information for each user, user population, or any suitable set of users. The databases can be entirely or partially stored on: the remote computing system, the user device(s), the vehicle system(s), or any other suitable computing system. The databases can be centralized, decentralized, or otherwise configured. The databases can be associated with an entity (e.g., insurance company, fleet company, etc.), associated with a set of social networking systems, or otherwise associated.

In a first variation, the databases can include a biometric database, which stores biometric data (e.g., fingerprints, facial images, eyeball images, etc.) for each user. The biometric data can be: received from a managing entity, automatically retrieved based on secondary identifying data (e.g., a social security number, name, email address, etc.), or otherwise obtained. In one example, the biometric database for a fleet entity can include facial images of all drivers within the fleet. In a second example, the biometric database for an insurance entity can include facial images for all insureds. However, the biometric database can store any other suitable data.

In a second variation, the databases can include a feature database, which stores feature values, extracted from the biometric parameter values, and/or vectors for each user. In one example, the feature database can include feature vectors for each of a plurality of users (e.g., associated with an entity), wherein the feature vectors can be extracted from primary biometric data (e.g., images) using the feature extraction module and/or any other suitable analysis module.

In a third variation, the databases can include a vehicle database, which stores vehicle information (e.g., make, model, mileage, etc.), vehicle history (e.g., history of vehicle locations, drivers, passengers, maintenance, accidents, etc.), or other vehicle information.

In a fourth variation, the databases can include a user database, which stores user profiles, user preferences (e.g., manually entered or automatically learned), user histories (e.g., history of user locations, vehicles driven, vehicles ridden in, accidents, etc.), or other user information. However, the databases can include any other suitable database storing any other suitable information.

The databases can be updated (e.g., with new information, adjusted values, etc.) upon occurrence of an update event, or at any other suitable time. In one variation, the biometric database is updated with new feature values and/or vectors for a new user in response to receipt of biometric data for the new user (e.g., wherein receipt of biometric data for a new user represents an update event). In a second variation, the biometric database is updated with feature values and/or vectors for an existing user when measured feature values and/or vectors exceed a threshold difference from an original set of feature values and/or vectors stored at the database (e.g., facial hair is detected as a feature of an existing user's face, and the biometric data for the existing user is updated to include the feature of facial hair). In a third variation, a scheduling database is updated to reflect that a user has been detected driving a vehicle during a predetermined time period (e.g., a time period in which the user is scheduled to drive, to credit the user for driving according to a predetermined schedule). However, any suitable databases can be otherwise suitably updated at any suitable time and/or in any suitable manner.

The client of the system functions to display notifications, display information, receive user inputs (e.g., associated with actions on the vehicle, schedule, databases, etc.), record sensor signals sampled by the user device, and/or perform any other suitable system. The client can be a native application, a browser application, an operating system application, or be any other suitable application or executable. The client preferably runs on a user device, but can alternatively run on any other suitable computing system. The client can include a management client (e.g., enabling account control, override authority, monitoring systems, etc.), a driver client (e.g., providing maps, dispatcher information, preferences, etc.), a passenger client, and/or any other suitable client for any other suitable entity.

The user device is preferably associated with a user through a user identifier (e.g., user account), but can alternatively or additionally be associated with the vehicle, management entity, or with any other suitable entity. The user device can be a mobile phone, laptop, smartphone, tablet, smartwatch, wearable device, or any other suitable mobile device. The user device is preferably connected to the server, wherein the connection is preferably a wireless connection, such as WiFi, a cellular network service, or any other suitable wireless connection, a near field connection, such as radiofrequency, Bluetooth, or any other suitable near field communication connection, or a wired connection, such as a LAN line. The user device can additionally or alternatively function as the server, such as in a distributed network system.

The user device can include power storage (e.g., a battery), processing systems (e.g., CPU, GPU, memory, etc.), user outputs (e.g., display, speaker, vibration mechanism, etc.), user inputs (e.g., a keyboard, touchscreen, microphone, etc.), a location system (e.g., a GPS system), sensors (e.g., optical sensors, such as light sensors and cameras, orientation sensors, such as accelerometers, gyroscopes, and altimeters, audio sensors, such as microphones, etc.), data communication system (e.g., a WiFi module, BLE, cellular module, etc.), or any other suitable component.

4. Method.

As shown in FIG. 1, the method for driver identification includes: recording a set of biometric signals S100 and identifying the user based on the biometric signals S200. The method functions to identify the driver of a vehicle for a driving session. The method can additionally take action based on the determined driver identity, such as logging driver hours, associating the driver with the vehicle, associating the driver with the driving session, loading driver preferences, or performing any other suitable action. The method can be performed in real or near-real time (e.g., as the biometric signals are recorded), after a delay, or at any suitable time. The method can be performed a predetermined number of times for a driving session, iteratively performed at a predetermined frequency for a driving session, or performed at any suitable time. Multiple instances of the method can be concurrently performed for multiple concurrent driving sessions (e.g., for different vehicles). However, any suitable number of method instances can be performed at any suitable time.

Recording a set of biometric signals S100 functions to record sensor signals indicative of an individual user. The biometric signals are preferably recorded by the vehicle system within a vehicle, but can alternatively be recorded by the vehicle itself, the user device, or by any other suitable sensor system. The biometric signals can include signals indicative of faces (e.g., facial features), fingerprints, eyeball patterns, or any other suitable biometric characteristic. These signals can include: images, touch patterns, spatial electromagnetic patterns, temporal electromagnetic patterns, or any other suitable signal.

One or more biometric signals of same or differing type can be recorded for each driving session (e.g., bounded by the occurrence of a beginning event or sampling event and an end event) and/or user. In one variation, multiple biometric signals (e.g., a sequence of images) can be recorded during a driving session, wherein the multiple biometric signals can be associated with a high probability that the driver did not change (and subsequently be cooperatively used to identify the driver). In a second variation, multiple biometric signals can be sampled substantially concurrently (e.g., within a predetermined time frame, such as several seconds of each other), wherein the multiple biometric signals can be associated with a high probability that the driver did not change. However, multiple biometric signals can be otherwise recorded at any other suitable time.

Figure 3:
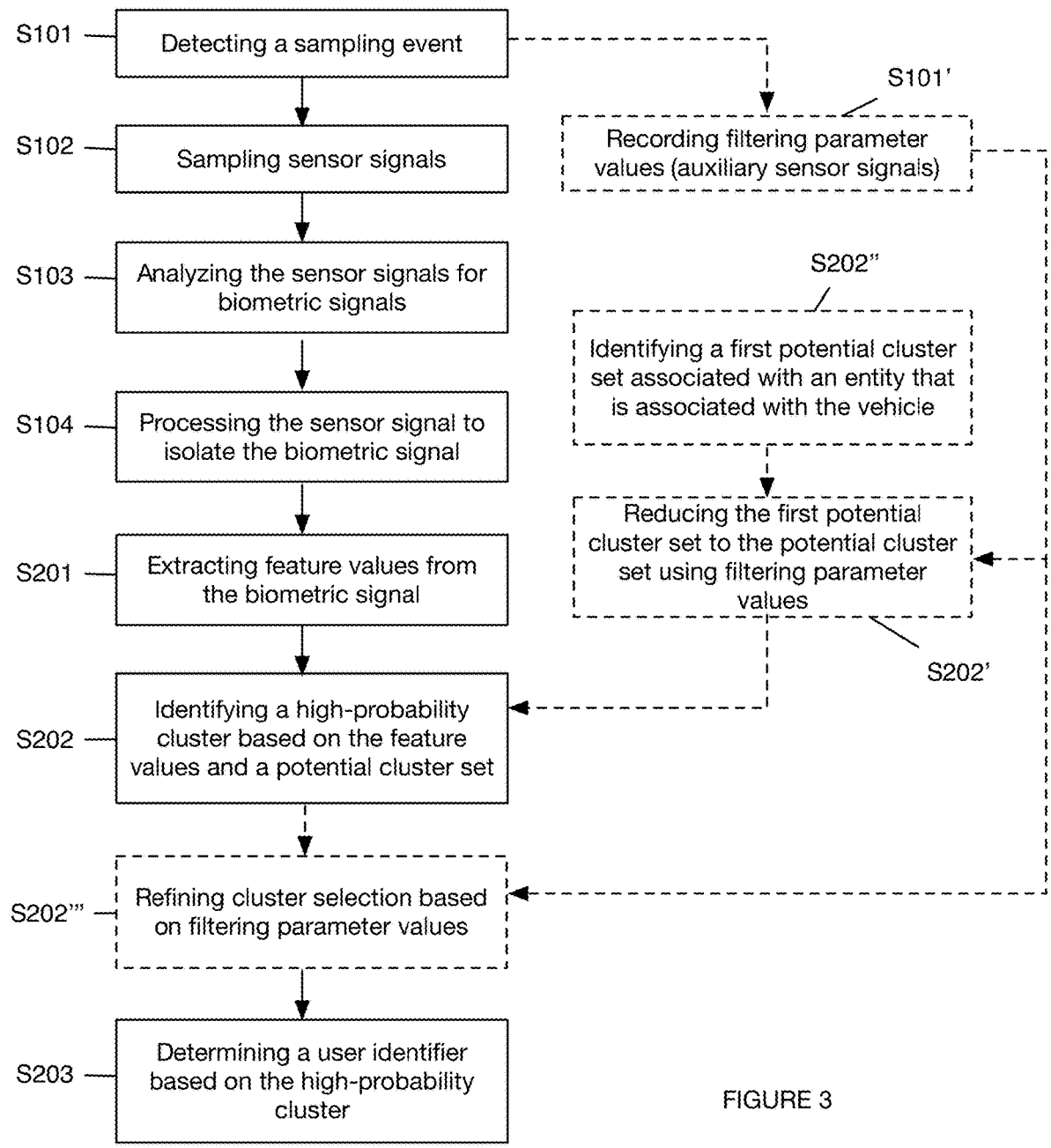
FIG. 3 is a schematic representation of a variation of the method.

As shown in FIG. 3, recording the set of biometric signals can include: sampling a sensor signal S102, analyzing the sensor signal for signals indicative of user biometrics S103, and/or storing sensor signals indicative of user biometrics (e.g., biometric signals). However, the biometric signals can be otherwise recorded. In a first variation, recording the biometric signals can include sampling the sensor signals, analyzing the sensor signal for biometric signals, and storing the detected biometric signals. In a second variation, recording the biometric signals can include sampling the sensor signals, storing the sensor signals, analyzing the sensor signals for biometric signals, and discarding the remaining sensor signals. In a third variation, all sensor signals (potentially indicative of the biometric signals) can be sampled and stored (e.g., without analysis). However, the biometric signals can be otherwise determined and recorded.

The sensor signals are preferably sampled from the vehicle system sensors, but can alternatively be sampled from the user device sensors, vehicle sensors (e.g., received from a diagnostic port, a wired connection, or a wireless connection), or any other suitable set of sensors. The sensor signals can be sampled at a predetermined frequency (e.g., 1 sample per second, 1 sample per minute, etc.), a frequency dependent upon vehicle system operation parameters (e.g., SOC, available memory, etc.), a frequency dependent upon ambient environment parameters (e.g., ambient temperature, ambient light, etc.), a frequency dependent upon driver identification confidence (e.g., sampling frequency decreased as confidence increases), a frequency dependent upon a computed probability (e.g., that the vehicle driver is associated with a driver identifier, a cluster probability, etc.), or at any other suitable frequency. In one example, the sampling frequency can increase as a function of increasing vehicle system battery SOC (state of charge). In a second example, the sampling frequency can increase as a function of increasing anticipated harvested power (e.g., increase with the amount of anticipated power from solar cells). In a third example, the sampling frequency can decrease as a function of increasing ambient or internal temperature (e.g., reduce sampling frequency when the temperature exceeds 65° C.). In a fourth example, the sampling frequency can decrease as a function of increasing user movement (e.g., as determined from increased noise recorded by the audio sensor, increased movement recorded by the accelerometer, etc.). The sampling frequency can be static, manually adjustable, dynamically adjustable, periodically variable (e.g., modulated), or be held constant and/or variable in any suitable manner. However, the sensor signals can be sampled (e.g., recorded, taken, etc.) at any other suitable frequency.

Sampling sensor signals S102 can include: providing power to the sensor at the sampling frequency, temporarily recording sensor outputs at the sampling frequency (e.g., from a sensor output stream), or otherwise sampling the sensor signal. For example, sensor signal sampling can include recording images (e.g., a sequence of images, individual images, etc.) of the driver volume at the sampling frequency. Sensor signal sampling can additionally include temporarily adjusting parameters of the monitored space (e.g., the driver volume). For example, adjusting parameters of the monitored space can include turning on a flash (e.g., white light, IR light, etc.) during image recordation. Sensor signal sampling can include adjusting sensor signal sampling rates S102'', which can be performed in any suitable manner (e.g., by decreasing sampling rates, increasing sampling rates, etc.) and/or with any suitable basis (e.g., based on a user profile, based on a bandwidth limitation, etc.). However, the sensor signal can be sampled in any other suitable manner.

The method can include Block S104, processing sensor signals to determine (e.g., isolate) biometric signal(s). S104 can include analyzing the sensor signal for signals indicative of user biometrics, which functions to extract biometric signals from the sensor signals. This can also function to reduce the amount of data stored by the vehicle system and/or user device, which can have limited memory. The sensor signals are preferably analyzed in real- or near-real time (e.g., as they are sampled), but can alternatively be analyzed after a delay or at any other suitable time. In one variation, analyzing the sensor signals for biometric signals includes identifying a predetermined object class or type within the sensor signal set. This can include calculating a probability that the object class or type appears within the signal set and retaining sensor signals having a probability above a probability threshold, matching a pattern within the signal set to a predetermined pattern associated with the object, or otherwise determining that the predetermined object class or type appears within the signal set. In variations in which the sensor signal includes a sequence of images, analyzing the sensor signal can include selecting one or more images of the sequence, and/or analyzing a selected image of the sequence. Image selection from a sequence of images can be based on image quality (e.g., ambient light level), image content (e.g., a projected area of a head region of a driver exceeding a threshold projected area), randomly selected, be frames separated by a predetermined number of frames, or selected with any other suitable basis. However, the sensor signals can be otherwise analyzed.

Figure 11:
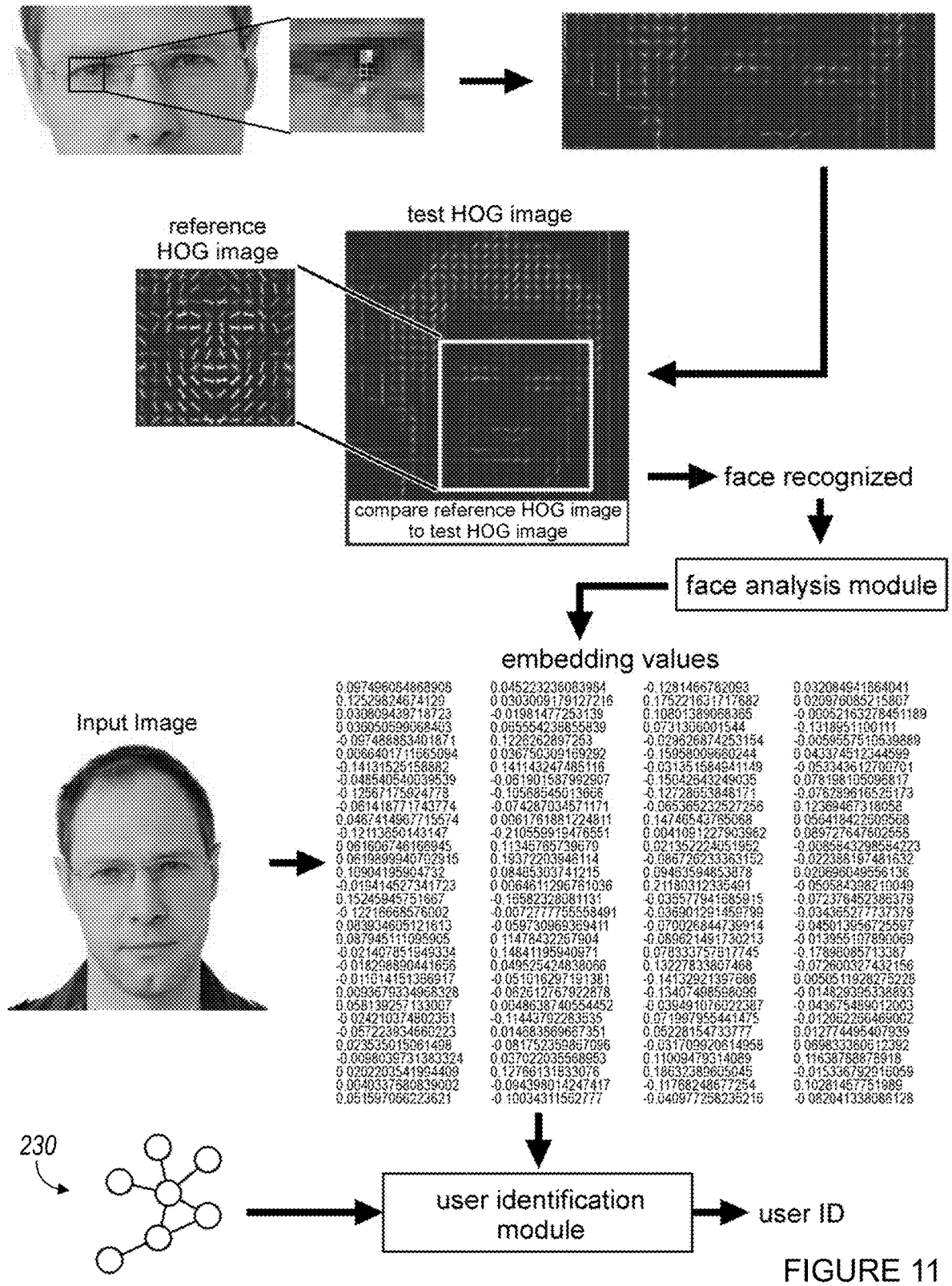
FIG. 11 is a second specific example of the method.

In one embodiment, this can include identifying a predetermined object class or type within an image (e.g., using an object detection module 231). In one example of this variation, analyzing the sensor signals for biometric signals can include analyzing the sampled image for a face, using a facial detection module, wherein the facial detection module can use a geometric approach, photometric approach, a neural network (e.g., CNN), object model-based methods (e.g., edge detection, primal sketch, Lowe, recognition by parts, etc.), appearance-based methods (e.g., edge matching, divide and conquer, grayscale matching, gradient matching, histograms of receptive field responses, HOG, large model-bases), feature-based methods (e.g., interpretation trees, hypothesize and test, pose consistency, pose clustering, invariance, geometric hashing, SIFT, SURF, bag of words representations, Viola-Jones object detection, Haar Cascade Detection), genetic algorithms, or any other suitable approach. In a specific example (illustrative example shown in FIG. 11), this includes generating a HOG image from the frame (e.g., using a global analysis module, face-specific analysis module), matching the extracted HOG pattern with a predetermined HOG pattern for a face (and/or specific user), projecting and/or posing the faces (e.g., using face landmark estimation, affine transformation, and/or other feature identification methods or transformations), encoding the image using an embedding or set of measurements (e.g., using a CNN trained on images of the user(s)), and identifying a user (e.g., within a cluster) based on the embedding values (e.g., using a classifier, such as a SVM classifier). Analyzing the image can additionally include: applying an exposure program that exposes user faces in the image; applying image histogram normalization within the image region where the face is detected; applying dynamic shadow and highlight equalization (e.g. non-linear regional tone maps) to reduce contrast in side-lit situations; applying foreground-background segmentation to isolate the face (e.g., wherein the background can be based on an image of the empty vehicle); determining image quality (e.g., blur, lighting, etc.); extracting an image segment containing the detected face as the biometric signal; and/or otherwise processing the image. However, the sensor signals can be otherwise analyzed.

Storing the sensor signals indicative of user biometrics S105 functions to retain the biometric signals for further analysis. The sensor signals can be temporarily or permanently stored in the recording system (e.g., vehicle system, user device, etc.), the remote computing system, or any other suitable system. In a first variation, the biometric signals are temporarily stored on the recording system, wherein the biometric signals are subsequently partially or entirely processed into a user identifier by the recording system. In a second variation, the biometric signals are transmitted from the recording system to a remote computing system, wherein the remote computing system stores the biometric and/or sensor signals for analysis. The recording system can transmit batches of multiple signals, individual signals (e.g., stream the biometric signals), or transmit any suitable number of signals. The recording system can transmit the signals at a predetermined frequency, a frequency dynamically selected based on instantaneous and/or anticipated operation parameters (e.g., increased when increased sun exposure is anticipated, decreased when the SOC is low, etc.), a frequency dynamically selected based on latency, accuracy, and connectivity requirements, a frequency selected by the processing system (e.g., based on the amount of data needed to positively identify the user), or transmitted at any other suitable frequency. The recording system can transmit the signals using a predetermined communication protocol (e.g., WiFi, BLE, etc.), a communication protocol dynamically selected based on the instantaneous and/or anticipated operation parameters, or using any other suitable communication protocol. The recording system can transmit the signals using an on-board communication system, via an intermediary system's communication system (e.g., the user device's communication system, the vehicle's communication system), or through any other suitable communication route. However, the sensor signals can be otherwise stored.

As shown in FIG. 3, biometric signal recordation is preferably initiated in response to the occurrence of a sampling event but can alternatively be recorded at any other suitable time. Biometric signal recordation can be automatically initiated: substantially immediately, upon detection of the sampling event; a predetermined time after sampling event detection; or at any other suitable time. Biometric signal recordation can be iteratively performed after sampling event detection at a predetermined frequency, upon occurrence of subsequent sampling events, at a frequency dependent upon a driver identity confidence score (e.g., wherein the sampling frequency varies as an inverse function of the driver identity probability or confidence score), or at any other suitable time. The sampling event can be detected using the same sensors for biometric signals recordation, different sensors, or any other suitable set of sensors.

The sampling event can be indicative of: imminent driver proximity to the vehicle; driver proximity to the vehicle; imminent driving session initiation; driving session initiation; or any other suitable context.

In a first variation, the sampling event includes the instantaneous time substantially matching a scheduled driving time (e.g., based on a predetermined driving schedule, learned schedule, time inferred from a user's calendar, etc.).

In a second variation, the sampling event can be detecting user proxy proximity to the vehicle. In a first example of the second variation, the sampling event can be the user client on the user device detecting an RSSI above a threshold value or receipt of a short-range packet, such as a Bluetooth identifier (e.g., receiving a beacon packet), broadcast by the vehicle system, vehicle, or other system associated with the vehicle. In a second example of the second variation, the sampling event can be the user client on the user device connecting to the vehicle system and/or network generated by the vehicle system. In a third example of the second variation, the sampling event can be the vehicle system detecting a short-range packet broadcast by user system (e.g., dongle, user device, etc.).

In a third variation, the sampling event can be detecting a sensor signal pattern and/or combination substantially matching a predetermined pattern and/or combination. In a first example of the third variation, the sampling event can be the accelerometer and/or IMU measurements and the audio sensor signals substantially matching a predetermined pattern associated with door opening and/or closing. The sensors can be sampled at a rate of 100 Hz or more, 50 Hz, or at any other suitable rate. In a second example of the third variation, the sampling event can be the audio sensor signals substantially matching a predetermined pattern associated with vehicle engine operation or shutoff (e.g., using RMS algorithms, power-spectral measurements for engine RPM harmonics, etc.) and/or user presence (e.g., voice detection, conversation analysis, etc.). In a third example of the third variation, the sampling event can be the location signals (e.g., measured locations) substantially matching a predetermined pattern associated with vehicle motion (e.g., wherein the measured location changes above a predetermined rate, above the location sensor noise, etc.). In a specific example, the sampling event can be detected when the vehicle is determined to have moved more than a threshold distance (e.g., 50 meters), when the vehicle is determined to move faster than a threshold velocity (e.g., 5 mph) for a threshold period of time (e.g., 1 minute). In a fourth example of the third variation, the sampling event can be the images recorded by an external-facing camera indicating movement (e.g., through scene comparison, visual odometry, etc.). In a fifth example of the third variation, the sampling event can be the accelerometer signals substantially matching a predetermined pattern associated with driver ingress into the vehicle (e.g., weight shifts) and/or vehicle operation (e.g., longitudinal acceleration exceeds a predetermined threshold for a predetermined period of time). In a sixth example of the third variation, the sampling event can be detecting a new object within the camera's field of view (e.g., based on successive frame analysis). In a seventh example of the third variation, the sampling event can be a vehicle parameter (e.g., received from the vehicle ECU, communication system, etc.) matching a predetermined state or satisfying another condition. In a specific example, the sampling event can be the door opening and closing within a predetermined time window.

In a fourth variation, the sampling event can be detecting vehicle accessory operation, wherein vehicle accessory operation can be determined from signals read from the vehicle bus (e.g., through the OBD port, through a communication connection to the vehicle, etc.), inferred from sensors, or otherwise determined. In one example, the sampling event can be the vehicle door locks unlocking, the trunk opening, the lights turning on, driver's volume or seat sensor readings (e.g., body weight detection, etc.), or operation of any other suitable accessory subsystem, as received from the vehicle diagnostics port.

In a fifth variation, the sampling event can be an authentication event, wherein the determination of the driver identifier is performed (e.g., via image processing and/or other computer vision techniques and processes) in response to successful authentication of the user based on the authentication event. For example, the authentication event can include detection of a mobile device associated with the user (e.g., via Bluetooth, NFC, BLE, etc.), and determination of the driver identifier can include confirming that the user associated with the detected mobile device is the driver based on extracting biometric signals from a sequence of captured images. In another example, the authentication event can include pairing a vehicle telemetry module (e.g., interfaced with the vehicle via an OBD port) with a user device (e.g., a mobile device of the user) and extracting a first authentication factor based on successful pairing. However, any other suitable sampling event or combination thereof can be otherwise suitably detected and/or used.

The method can optionally include detecting an end event, which functions as a cutoff for driving session data collection. The end event can optionally cease biometric signal sampling, or be otherwise used. The end event is preferably indicative of driving session termination, but can be indicative of any other suitable context. The end event can be determined using the same or different techniques as sampling event determination. Examples of the end event include: the door opening and closing within a given time period, vehicle ignition placement in the off position, longitudinal acceleration falling below a predetermined threshold for a predetermined period of time, vehicle transmission placement in a parked gear, or when any suitable condition associated with driving session termination is met.

Biometric signal sampling can be terminated upon occurrence of a sampling termination event, or at any suitable time. The sampling termination event can be: the end event (e.g., driving session termination event), the driver identity confidence score (e.g., driver identity probability) exceeding a predetermined threshold (e.g., manually determined, determined based on the fleet size or driving context, etc.), or be any other suitable event determined based on any suitable data (e.g., such as the data mentioned herein) using any suitable method (e.g., such as the methods mentioned herein). However, the biometric signal sampling for a driving session can be otherwise bounded or controlled.

Identifying the user (e.g., determining a driver identifier of the user) based on the biometric signals functions to identify the driver and/or passenger identity. The user is preferably identified from a predetermined user set associated with an entity (e.g., a fleet entity, an insurance entity), but can alternatively be determined from a global user set (e.g., aggregated from one or more biometric data sources, such as social networking systems), from a subset of the predetermined user set (e.g., users associated with both the vehicle and the fleet entity, etc.), or from any other suitable user set.

In a first variation, identifying the user based on the biometric signals includes matching the biometric signal to a stored biometric signal from the predetermined user set, and determining the user identifier associated with the stored biometric signal. In one example, this can include matching the acquired user fingerprint (e.g., received from a touch sensor) to a stored user fingerprint, and determining the user identifier associated with the stored user fingerprint. In a second example, this can include matching the acquired spatial voltage pattern (indicative of a fingerprint) to a stored spatial voltage pattern, and determining the user identifier associated with the stored spatial voltage pattern. The match can be within a predetermined error threshold (e.g., 5%), be an exact match, or be otherwise bounded. However, the user can be otherwise identified.

Figure 5:
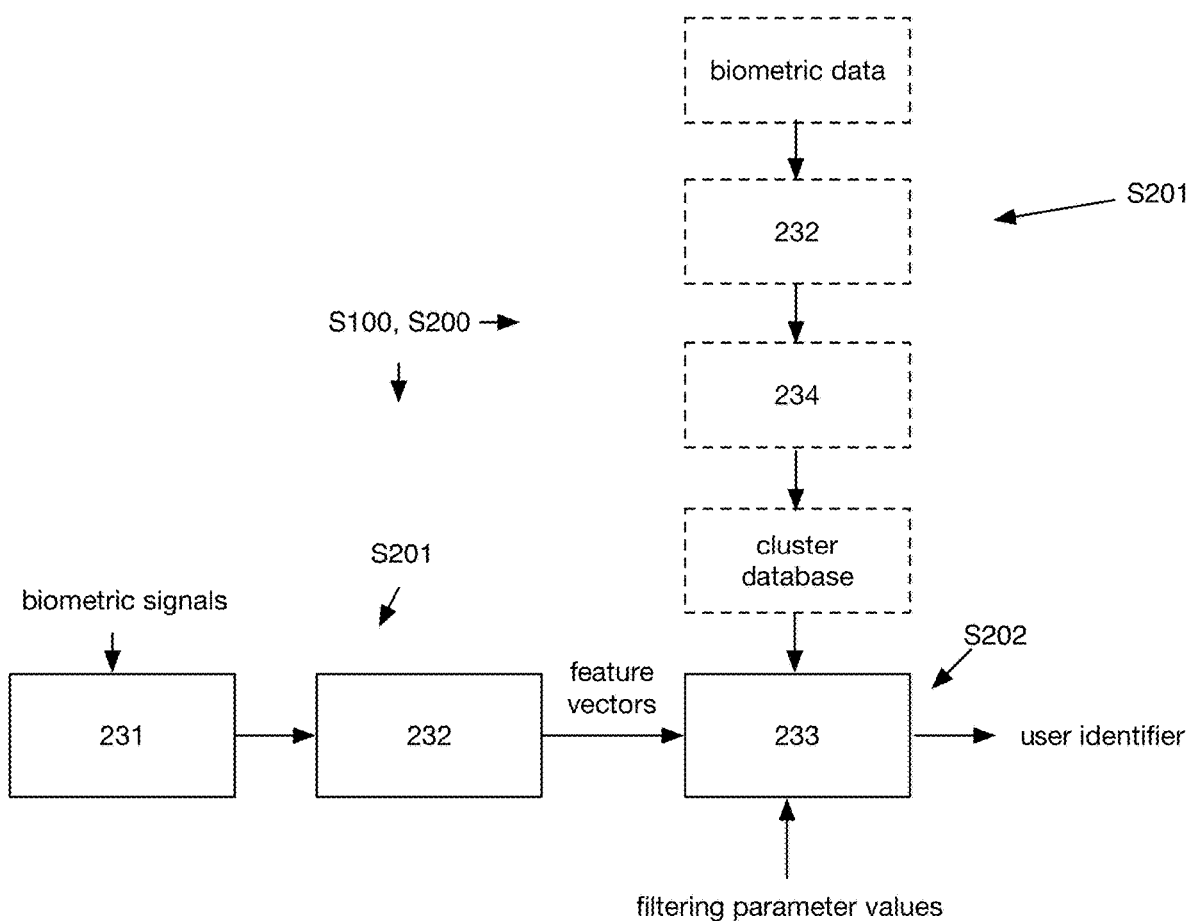
FIG. 5 is a schematic representation of a variation of the analysis system.
Figure 6:
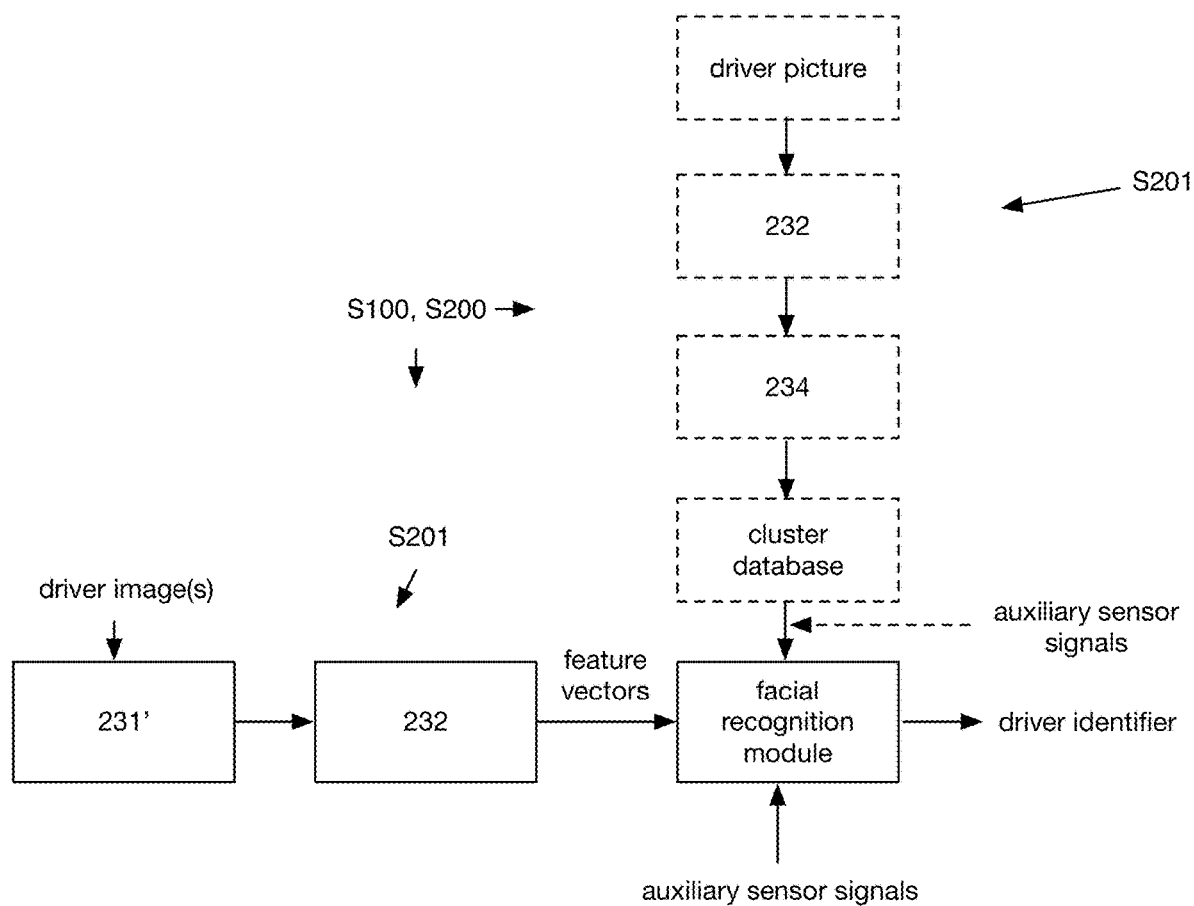
FIG. 6 is a schematic representation of an embodiment of the variation of the analysis system.

In a second variation, identifying the user based on the biometric signals includes extracting values for a set of features from the set of biometric signals S201, identifying a high-probability cluster based on the extracted feature values S202, and determining a user identifier based on the high-probability cluster S203 (shown in FIG. 3; analysis module configuration shown in FIG. 5, example analysis module configuration shown in FIG. 6).

Figure 12:
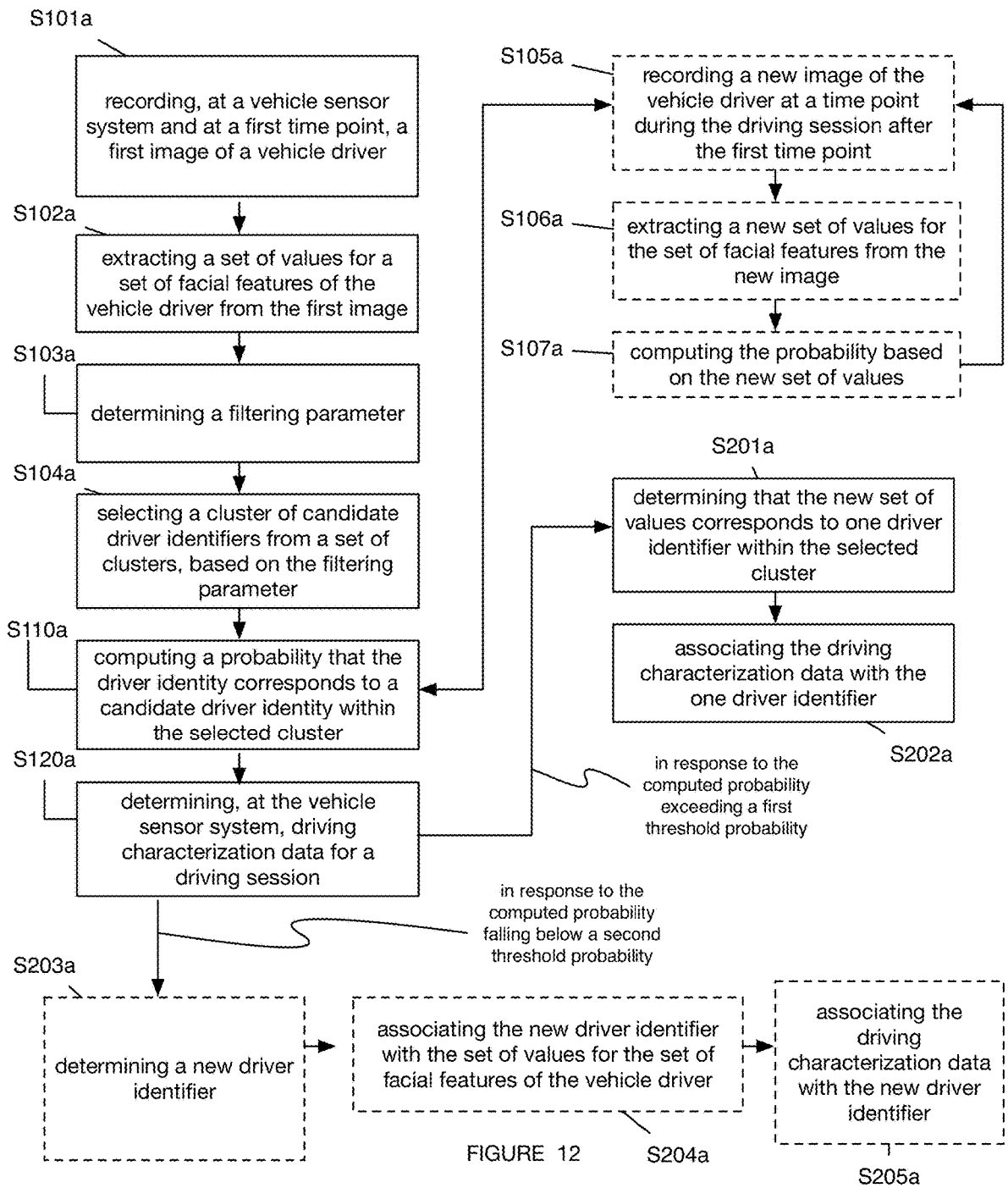
FIG. 12 is a third specific example of the method.
Figure 13:
FIG. 13 is a specific example of a variation of a portion of the method.

Extracting values (e.g., a set of values) for a set of features S201 functions to reduce the biometric signals into a quantified basis for analysis (e.g., calculation, comparison, etc.). The feature values are preferably extracted by the feature extraction module 232 (e.g., a decomposition module), but can be extracted by any other suitable analysis module. The feature values can be extracted from a single biometric signal, from a plurality of biometric signals of the same type (e.g., a plurality of images), from a plurality of biometric signals of differing types (e.g., a plurality of images and accelerometer data), or from any other suitable set of biometric signals. In one variation, extracting feature values from the biometric signals S201 includes applying a decomposition model to each candidate face image of the set to extract feature values (examples shown in FIGS. 10 and 12). Features can include position of eyes, nose, mouth, ears, or other facial landmarks; outline or shape of eyes, nose, mouth, ears, head, or other facial aspect; relative position of facial landmarks; facial landmark or feature size, color, or other parameter; or any other suitable feature within a predetermined feature space. The decomposition model can use a Gabor filter, wavelet decomposition, higher-order singular value decomposition, sparse and low rank matrix decomposition, singular value decomposition, deformable face model, or any other suitable decomposition and/or extraction technique. In one example, a decomposition model can be applied to a candidate face within an image (e.g., full image, image segment) to decompose the candidate face into unique features in the vector space. In a specific example, feature extraction from an image of the candidate face includes: aligning the detected face with a target model (e.g., 3D virtual model, 2D model, etc.; using facial features or other reference points), and applying a neural network decomposition model to the aligned detected face to obtain a face vector for the candidate face. However, any other suitable feature extraction model can be applied.

Identifying a high-probability cluster based on the extracted feature values functions to reduce the population of possible users to a smaller subset of possible users. The extracted feature values used for cluster identification can be from a single image, from multiple images of the same driver (e.g., known or estimated, based on a shared driving session), or from any other suitable set of sensor signals.

The high-probability cluster is preferably identified from a set of potential clusters (e.g., by identifying a potential cluster set S202"), but can be determined from any other suitable set of clusters. The set of potential clusters is preferably generated from the biometric data (e.g., the feature values, feature vectors, etc.) for each driver associated with the managing entity (e.g., the fleet entity, the insurance entity, etc.), but can alternatively be otherwise generated.

The set of potential clusters can be a subset of the larger set of potential clusters associated with the managing entity, wherein the larger set of potential clusters can be reduced to the subset of potential clusters by filtering or otherwise processing the potential clusters using filtering parameters S202'. Filtering parameters (e.g., priors) can include histories (e.g., drivers historically associated with the vehicle, drivers historically associated with the vehicle during that recurrent time, drivers historically associated with the timeframe, routes historically taken by a driver, etc.), sensor signals associated with the driving session (e.g., drivers historically generating the characteristic accelerometer patterns, etc.), schedules (e.g., drivers scheduled to drive during the timeframe, drivers assigned to the vehicle for the time period, vehicles assigned to the drivers for the time period, etc.), secondary identifiers (e.g., drivers associated with a detected user device identifier, etc.), hardware identifier(s) associated with a user (e.g., associated with a mobile device of a vehicle driver), biometric feature values, or any other suitable parameter. The filtering parameter values for each driver, vehicle, or other data structure can be timestamped, geotagged, or associated with any other suitable information. Filtering parameter values are preferably computed based on values extracted from the recorded biometric signal(s); however, filtering parameter values can be otherwise suitably computed and/or determined. In one example, the set of potential clusters can include only feature vectors for drivers that have historically driven the vehicle. In a second example, the set of potential clusters can include only feature vectors for drivers that create the characteristic sensor patterns. In another example, the method includes recording filtering parameter values in response to detecting a sampling event S101'. However, the larger set of potential clusters can be otherwise reduced to increase processing speed, or be used as the potential cluster set from which the high-probability cluster is identified.

Figure 10:
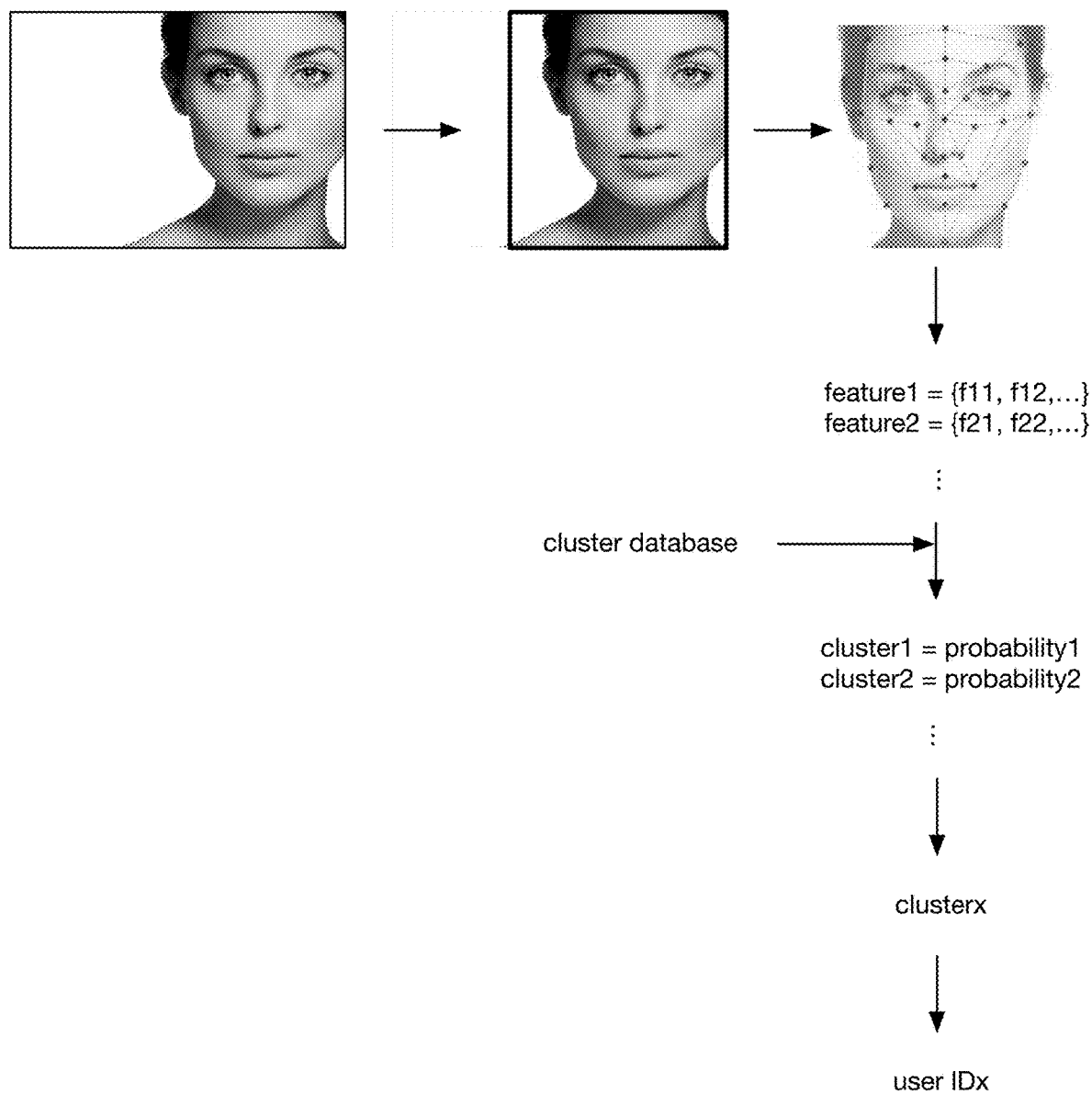
FIG. 10 is a first specific example of the method.

Identifying the high-probability cluster can include: for each potential cluster of the set, calculating a probability that the driver belongs within the respective cluster based on the extracted feature vectors (cluster probability); and selecting the cluster with the highest probability or probabilities as the high-probability cluster (specific example shown in FIG. 10). In one embodiment of the first variation, calculating the probability can include averaging related vectors together (of the extracted feature vectors), and calculating the distance to the nearest clusters in of the potential cluster set. In a second embodiment of the first variation, calculating the probability can include calculating the distance between each vector (from the extracted feature vector) and the nearest cluster in the potential cluster set, then averaging the distances of related vectors. However, the probability for each cluster can be otherwise calculated. The cluster probability can, in variations, include the likelihood that a candidate driver identity (e.g., user identifier) within a cluster corresponds to the identity of the vehicle driver. The method of cluster probability calculation can be predetermined, dynamically selected (e.g., based on distribution of noise in system, etc.), or otherwise determined.

Identifying the user based on the biometric signals can additionally include electing a cluster, which can function to select a cluster from a set of high-probability clusters, after cluster probabilities have been determined.

In a first variation, the cluster is elected using filtering parameter values (example shown in FIG. 5). For example, the filtering parameter values for the driving session can be used to increase the probability of a first cluster over a second cluster when the filtering parameter values substantially match the filtering parameter values associated with the first cluster and substantially differ from the filtering parameter values associated with the second cluster. In a second example, the probabilities for each of a set of clusters can be calculated based on the filtering parameter values, independent of the biometric signals; the filtering parameter probabilities and the biometric signal probabilities can then be compared to select the high-probability cluster. However, the cluster can be otherwise elected using the filtering parameter values.

In a second variation, the cluster is manually elected. For example, the biometric signal (e.g., the image of the driver's face) and signals associated with the high-probability clusters (e.g., the faces of potential drivers) can be sent to an election user, wherein the election user manually selects the signal they deem most similar to the biometric signal. The cluster associated with the selected signal can then be set as the high-probability cluster. The manual selection can additionally be used as a supervised training set to subsequently train the cluster identification and/or selection module. However, the high-probability cluster can be otherwise determined.

Determining a user identifier based on the high-probability cluster functions to identify the user identifier for the driver or other user. In a first variation, the user identifier is the user identifier associated with the high-probability cluster (e.g., wherein each cluster represents one user). In a second variation, a sub-cluster can be identified from within the high-probability cluster using the feature vectors (e.g., a same or different set of features as that used to determine the high-probability cluster), wherein the user identifier is the user identifier associated with the identified sub-cluster. The sub-cluster can be determined in a similar manner to that used to determine the high-probability cluster, or can be determined in any other suitable manner. In some variations, the sub-cluster can correspond to a single driver identity (e.g., a candidate driver identity), such that identifying a sub-cluster includes identifying that a driver identity corresponds to a candidate driver identity within a selected cluster (e.g., a high-probability cluster). However, the user identifier can be otherwise determined based on the high-probability cluster.

In a first embodiment of the second variation of identifying the user, the cluster probability is iteratively refined (e.g., the method can include refining the cluster selection S202'") or re-calculated based on all biometric signals recorded during a driving session (e.g., recorded since occurrence of the sampling event). In this embodiment, a cluster is selected when the respective cluster probability exceeds a threshold probability. In a second embodiment of the second variation of identifying the user, the cluster and/or user identity probabilities are determined based on a subset of biometric signals recorded during the driving session (e.g., a single signal, signals within a sliding window, etc.), wherein a cluster and/or user identity is selected for each biometric signal subset. In this embodiment, the clusters and/or user identities selected for each biometric signal subset can be compared against each other, and the cluster and/or user identity with the highest number of occurrences (e.g., votes) is selected as the user identity. However, the user can be identified based on another metric (e.g., percentage feature match), using another method (e.g., a neural network), or otherwise determined.

The method can optionally include determining the driver identity using a secondary identifier associated with the driver (e.g., supporting two-factor authentication). The secondary identifier can be used to limit (e.g., select) the clusters to be searched, limit the user identifiers to be searched within each cluster, verify the determined user identity (e.g., wherein the user identity is determined using computer vision techniques discussed above, sensor fusion techniques, etc.), differentiate between users with similar biometric features, or be otherwise used. The secondary identifier can be: a wireless identifier broadcast by the user device or auxiliary hardware (e.g., a beacon, Bluetooth module, RFID, dongle, etc.); a user device identifier (e.g., cell phone signature, etc.) received through a handshake (e.g., over WiFi, LTE, etc.) or otherwise received; credential information extracted from the image(s) (e.g., wherein the driver holds up the credential for concurrent credential and face image recordation, etc.), such as driver's license information, a pattern issued to the driver, or other credential information; a pattern of user action (e.g., instructed by the system) detected from the series of images, user device sensors, and/or vehicle sensors; an ID number unique to the driver (e.g., received at a user input of an auxiliary system, user device, vehicle console, etc.), which can be permanently assigned to the user (e.g., a PIN) or dynamically assigned (e.g., a code texted to the user device associated with the driver identifier determined based on the image, a code texted to the scheduled driver for the vehicle, etc.); a secondary biometric signal (e.g., thumbprint, retinal pattern, voice, etc.); a schedule (e.g., associating a driver and a vehicle for the time period); or be any other suitable secondary identifier and/or authentication input (e.g., provided by the driver). The secondary identifier can be received before, after, or during user identifier determination, or at any other suitable time.

Upon identification, the user identifier can be stored in the vehicle database and/or user database. Secondary information, such as time, cluster probability, sensor signal source, number of sensor signals used, or other information can additionally be stored with the user identifier in the database. This secondary information can facilitate later searches that compile scores based upon driver identifiers, wherein the scores can be calculated based upon varying stringency for driver identification and score as a function of calculated stringency. However, the information can be otherwise used.

In one variation, the user identifier is timestamped and stored in the vehicle database and/or user database in association with driving session data. Driving session data (driving characterization data) can include: a start time, an end time, sensor signals recorded during the driving session (e.g., video, audio, or other sensor signals recorded at a predetermined frequency, recorded at a frequency dependent upon the identified driver's driving profile, etc.), start location, end location, route information, derivative data (e.g., sensor fusion outputs, driving characterization, etc.), driver performance data (e.g., distraction metrics), vehicle operation parameters (e.g., vehicle speed, acceleration, pedal position, wheel position, etc.), vehicle operation characterizations (e.g., higher-level abstractions, such as number of swerves or lane deviations, near-collisions, other events, etc.), driving environment data (e.g., weather, road roughness, ambient light, obstacle behavior, etc.), or any other suitable information. The method can optionally include calculating a driver score for each driver (e.g., each user identifier) to rate the driver based on the associated driving session data. This driver score can be used for: scheduling (e.g., assigning drivers to different routes, vehicles, or tasks based on the respective driver score, such as assigning good drivers to difficult or high risk routes), insurance premium calculation, data filtering (e.g., selecting data associated with good drivers as training data for autonomous vehicle algorithm generation), or used in any other suitable manner.

In a second variation, the user identifier can be stored in the vehicle database and/or user database along with next-best user identifiers, wherein the next-best user identifiers can be user identifiers associated with clusters having similar probabilities. In a third variation, a user identifier for an adjacent driving segment can be stored in the vehicle database and/or user database in association with a driving segment without a positively identified driver. However, the user identifier can be otherwise stored.

However, the user can be otherwise identified based on the biometric signals.

The user identity can be entirely or partially determined by the vehicle system, the user device, the remote computing system, or by any other suitable system, wherein the processing system receives the biometric signals and/or derivatory data (e.g., feature values, vectors, etc.) from the recordation system. The system can use a single split processing variation, dynamically switch between different split processing variations (e.g., based on resource availability, etc.), or use any suitable split processing variation at any suitable time.

Figure 7:
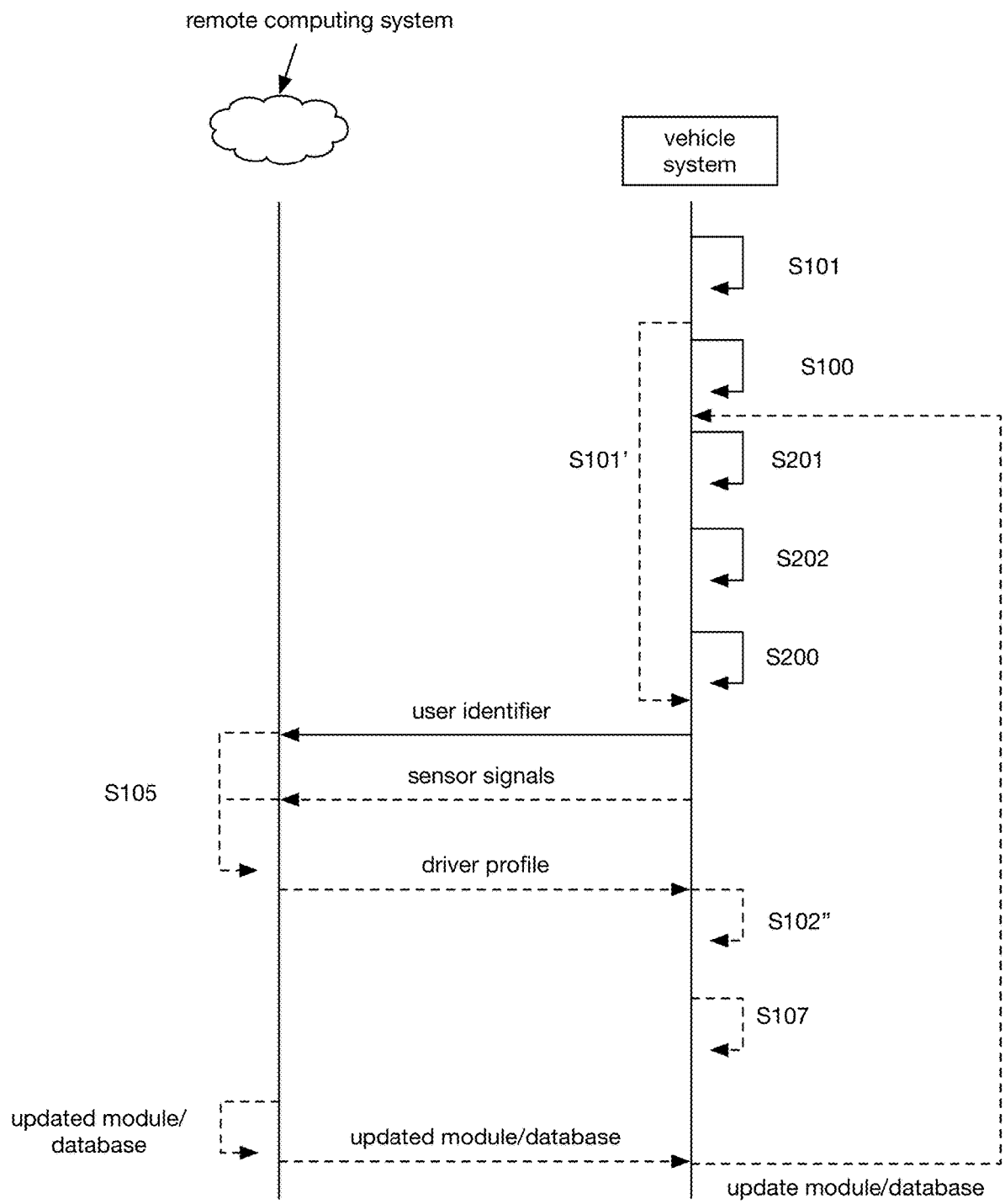
FIG. 7 is a schematic representation of a first split processing variation of the method.
Figure 8:
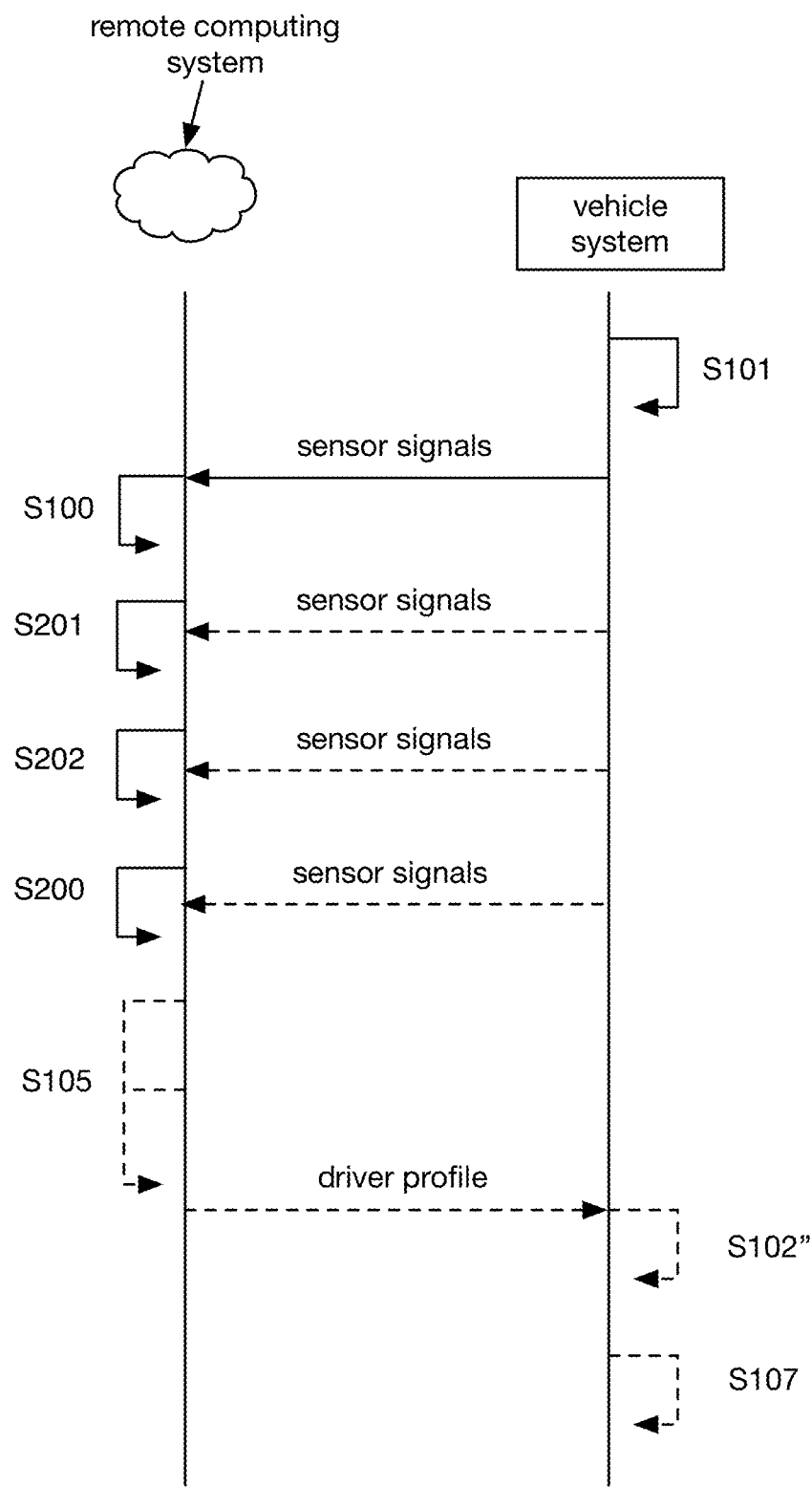
FIG. 8 is a schematic representation of a second split processing variation of the method.

In a first split processing variation, as shown in FIG. 7, the vehicle system performs the user identification based on the biometric signals, and transmits the user identifier (and/or secondary information, driving session information, etc.) to the remote computing system for long-term storage in the database. In this variation, the vehicle system can store the requisite analysis modules, store a subset of the potential clusters (e.g., for drivers who frequently drive the vehicle), store a subset of the biometric data (e.g., for drivers who frequently drive the vehicle), or store any other suitable information. In this variation, when an unknown driver is detected (e.g., that does not match the stored driver information), the system can dynamically switch to a different split processing variation to identify the unknown driver.

In a second split processing variation, as shown in FIG. 6, the remote computing system performs the user identification based on the biometric signals. In this variation, the vehicle system can transmit raw or partially-processed biometric signals (e.g., image segments with faces) to the remote computing system, wherein the remote computing system identifies the user based on the received biometric signals. In this variation, the remote computing system can optionally perform the remainder of the method. For example, the vehicle system can stream sensor signals to the remote computing system during the driving session (e.g., when the vehicle is moving, for a predetermined period of time after vehicle parking, etc.), wherein the remote computing system detects the sampling event and records the biometric signals.

Figure 9:
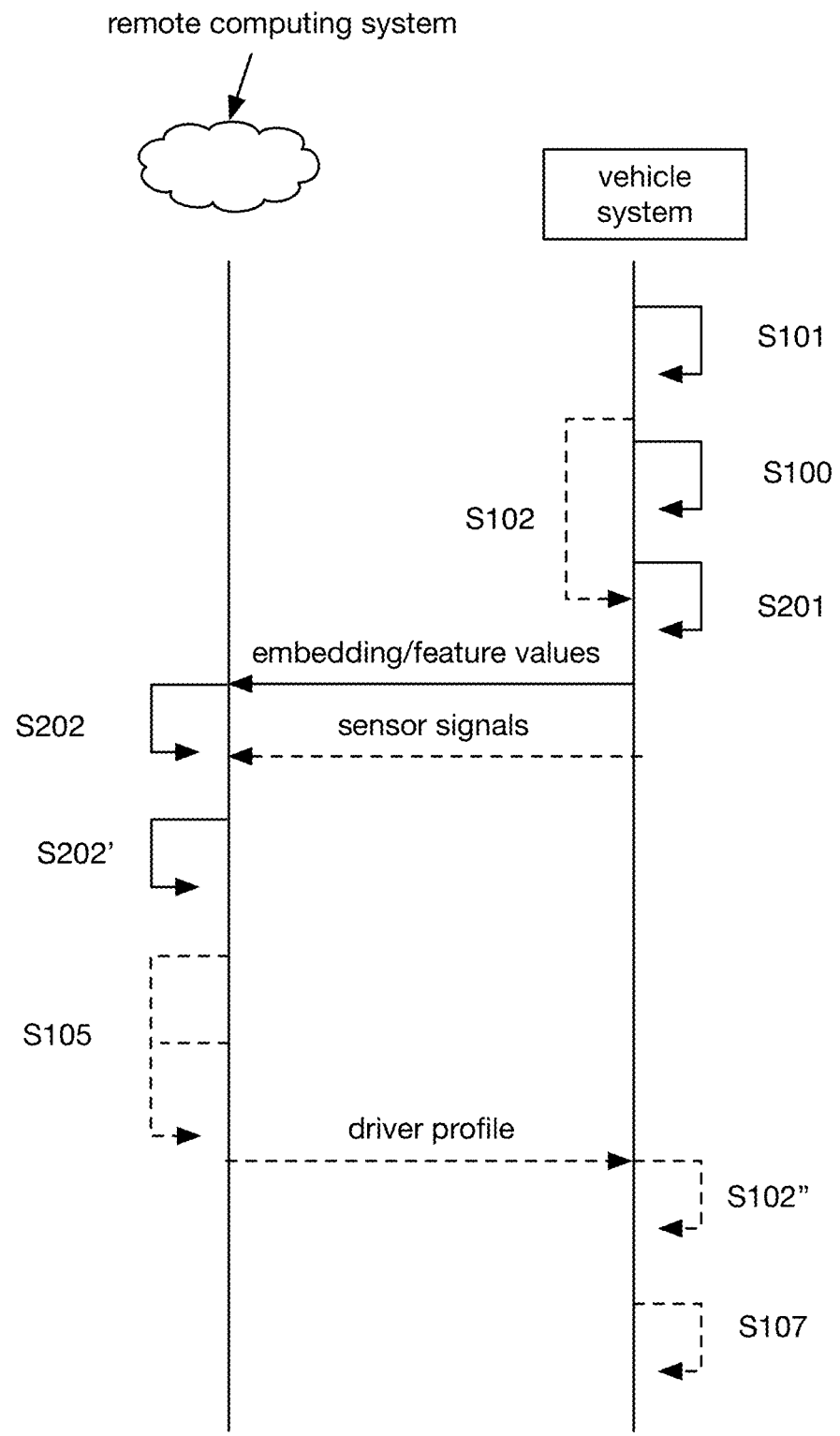
FIG. 9 is a schematic representation of a third split processing variation of the method.

In a third split processing variation, example shown in FIG. 9, the vehicle system can extract the feature values and optionally generate the feature vectors, and transmit the feature values (and/or the feature vectors) to the remote computing system. The remote computing system then identifies the user based on the feature values and the potential clusters. In this variation, the vehicle system can store the feature extraction modules, while the remote computing system stores the potential clusters, cluster identification modules 233, and other data.

However, the method processes can be otherwise split across one or more computing systems.

Identifying the user based on the biometric signals can additionally include detecting driver identity simulation attempts, which can function to detect identity fraud or reject drivers for a given driving session. In a first variation, detecting a driver identity simulation attempt can include recording a series of images as the biometric signal, extracting feature values for each of the images, determining a variance between the values for a given feature, and detecting a driver identity simulation attempt in response to the variance falling below a threshold variance. In a second variation, the driver identity simulation attempt can be detected in response to the variance between the values for each of a plurality of features falling below a threshold variance (e.g., wherein each feature can be associated with a different threshold variance). In a third variation, detecting a driver identity simulation includes: determining the driver identity from a series of images, comparing the determined driver identity to a scheduled driver identity, and rejecting the driver in response to a mismatch between the determined and scheduled driver identities. In a fourth variation, detecting a driver identity simulation includes: rejecting the driver in response to the driver identity confidence score falling below a threshold score. This threshold score can be static, variable by a managing entity (e.g., higher false positive identifications can be higher for smaller fleets, and lower for larger fleets), or otherwise determined. However, the driver identity simulation attempt can be otherwise detected.

The method can additionally include taking corrective action in response to detecting the driver identity simulation attempt. Corrective action can include: locking the vehicle (e.g., locking the doors, locking the starter motor, disengaging a transmission, etc.), notifying a managing entity (e.g., sending the notification to a management client associated with the vehicle, presenting notifications to a user S107, etc.), and activating a vehicle monitoring device (e.g., a location tracker, a vehicle transponder, a cabin microphone, etc.). However, the method can include taking any other suitable corrective action or other suitable action.

The method can additionally include modifying vehicle-driver interfaces in response to detecting the driver identity. For example, modifying vehicle-driver interfaces can include adjusting the radio presets of the vehicle to match a predetermined set of radio presets associated with the detected driver identity in a database. In another example, modifying vehicle-driver interfaces can include automatically adjusting the seat position, mirror positions, control behaviors (e.g., a sport mode vs. regular driving mode governing accelerator sensitivity and handling), logging into a user account for the vehicle, and/or any other suitable parameters based on user preferences associated with the detected driver identity (e.g., stored in and retrieved from a database, stored locally at a mobile device of the user and retrieved from the mobile device, stored at the vehicle sensor system, etc.). However, the method can include modifying any other suitable vehicle-driver interfaces.

Figure 14:
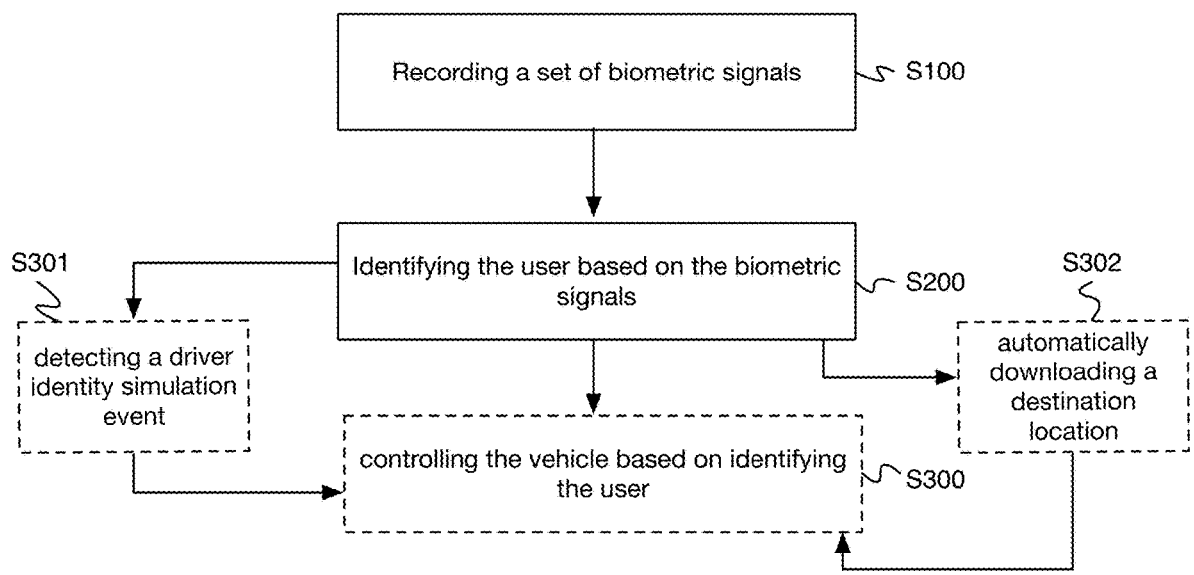
FIG. 14 is a flowchart representation of a variation of the method.

As shown in FIG. 14, the method can additionally include controlling the vehicle S300. In a first variation, the method includes controlling the vehicle in response to detecting the driver identity simulation event S301 (e.g., pulling the vehicle to the side of the road in a controlled manner, locking the doors, and transmitting a notification of fraudulent use to a managing entity and/or other authority). In a second variation, the method includes automatically downloading a destination location in response to identifying the driver and retrieving a scheduled destination associated with the identified driver S302, and automatically directing the vehicle to the downloaded destination (e.g., via a GPS navigation system, an autonomous driving system, a combination thereof, etc.).

The method can include identifying a new driver (e.g., determining a new driver identifier). A new driver can include a driver that has not been previously identified, a user whose driver identifier is not stored in a database, a driver whose driver identifier is not in a cluster of driver identifiers (e.g., a selected cluster), a driver who is not scheduled to drive during the driving session during which identification is being performed, and/or any other suitable driver. In a first variation, identifying a new driver can include computing the probability that a set of values for a set of facial features of the vehicle driver (e.g., extracted from an image of the driver) corresponds to a driver identifier of a cluster of driver identifiers, determining that the probability falls below a threshold probability, and generating a new driver identifier in response to the aforementioned determination. In a second variation, identifying a new driver can include receiving an input from the user (e.g., a login input at a client application rendered on a mobile device of the user) that is unrecognized (e.g., that does not correspond to previous login inputs for the vehicle), and thereby determining that the driver is a new driver. In a third variation, identifying a new driver can include prompting the driver (e.g., providing a displayed or spoken depiction of the statement "Is this you?" accompanied by a name and/or photograph of a known driver to the driver), receiving a response from the driver (e.g., a spoken response of "no" to the prompt, received at a user device, the sensor system, a vehicle microphone, etc.) indicative that the driver is a new driver. Identifying a new driver can additionally or alternatively include determining a new driver identifier (e.g., receiving a new driver identifier from the driver in the form of a spoken name, a typed username, a manually captured photograph, an automatically captured photograph, etc.) associated with the new driver. However, the driver can be identified as a new driver in any other suitable manner.

Identifying a new driver can include storing a new driver identifier in a database of driver identifiers (e.g., in a cluster of driver identifiers within the total set of driver identifiers in the database). Identifying a new driver can also include validating the new driver identifier (e.g., by way of a fleet manager viewing a captured image of the driver, the driver himself or herself responding to a prompt rendered at his or her mobile device, etc.), either remotely (e.g., at a remote computing system associated with a fleet manager), locally (e.g., at a mobile device of the driver), or in any other suitable location or combination of locations. Identifying a new driver can be performed at any suitable time (e.g., before the commencement of a driving session, during a driving session, after a driving session has concluded, etc.). In response to identifying a new driver, a new driver identifier can be added to an existing cluster of driver identifiers (e.g., an elected cluster, a high probability cluster), a new cluster can be generated and the new driver identifier added to the new cluster, a new cluster and existing cluster can be merged, an existing cluster can be subdivided into multiple new clusters, and/or any combination of the aforementioned behaviors or any other suitable behaviors.

In a first specific implementation of the method as shown in FIG. 10, the method includes recording, at a vehicle sensor system and at a first time point, a first image of a vehicle driver S101 a; extracting a set of values for a set of facial features of the vehicle driver from the first image S102 a; determining a filtering parameter S103 a; selecting a cluster of driver identifiers from a set of clusters, based on the filtering parameter S104 a; computing a probability that the set of values is associated with each driver identifier S110 a by repeating: recording a new image of the vehicle driver at a time point during a driving session and after the first time point S105 a, extracting a new set of values for the set of facial features from the new image S106 a, and computing the probability that the new set of values is associated with each driver identifier based on the new set of values S107 a; determining, at the vehicle sensor system, driving characterization data for the driving session S120 a; in response to the computed probability exceeding a first threshold probability, determining that the new set of values corresponds to one driver identifier within the selected cluster S201 a, and associating the driving characterization data with the one driver identifier S202 a; and in response to the computed probability associated with each driver identifier in the cluster falling below a second threshold probability, determining a new driver identifier S203 a, associating the new driver identifier with the set of values for the set of facial features of the vehicle driver S204 a, and associating the driving characterization data with the new driver identifier S205 a. In another implementation, in response to the probability exceeding a first threshold value, the driving session is automatically associated with a driver identifier; in response to the first threshold value exceeding the probability and the probability exceeding a second threshold value, a driver identification input is received from a user and the driving session is associated with a user-selected driver identifier; and in response to the second threshold value exceeding the probability, a new driver identifier corresponding to the feature vector is generated in combination with the auxiliary sensor signal and the new driver identifier is associated with the driving session. In yet another specific implementation, in response to a second probability exceeding a second threshold value, the driving session is automatically associated with the driver identifier; in response to the second threshold value exceeding the second probability and the second probability exceeding a third threshold value, a driver identification input is received from a user and the driving session is associated with a user-selected driver identifier; in response to the third threshold value exceeding the second probability, a new driver identifier is generated corresponding to the feature vector in combination with the auxiliary sensor signal and the new driver identifier is associated with the driving session; in response to the second probability exceeding a second threshold value, the driving session is automatically associated with the driver identifier; in response to the second threshold value exceeding the second probability and the second probability exceeding a third threshold value, a driver identification input is received from a user and the driving session is associated with a user-selected driver identifier; and in response to the third threshold value exceeding the second probability, a new driver identifier is generated corresponding to the feature vector in combination with the auxiliary sensor signal and the new driver identifier is associated with the driving session.

Although omitted for conciseness, the preferred embodiments include every combination and permutation of the various system components and the various method processes, wherein the method processes can be performed in any suitable order, sequentially or concurrently.

As a person skilled in the art will recognize from the previous detailed description and from the figures and claims, modifications and changes can be made to the preferred embodiments of the invention without departing from the scope of this invention defined in the following claims.

We claim:

1. A method for driver identification comprising:
   recording an image sequence of a vehicle driver at an interior-facing camera of a vehicle system during a driving session, in response to detecting a sampling event;
   determining a presence of a face in each image of the image sequence at a face detection module of the vehicle system to generate an image sequence subset;
   transmitting the image sequence subset to a remote computing system;
   extracting a feature vector from the image sequence subset at a feature extraction module of the remote computing system;
   determining a set of auxiliary sensor signals;
   computing a probability that the vehicle driver is associated with a driver identifier based on the feature vector in combination with the set of auxiliary sensor signals;
   in response to the probability exceeding a first threshold value, automatically associating the driving session with the driver identifier;
   in response to the first threshold value exceeding the probability and the probability exceeding a second threshold value, receiving a driver identification input from a user and associating the driving session with a user-selected driver identifier; and
   in response to the second threshold value exceeding the probability, generating a new driver identifier corresponding to the feature vector in combination with the auxiliary sensor signal and associating the new driver identifier with the driving session.

2. The method of claim 1, further comprising transmitting the image sequence subset in response to a number of images in the subset exceeding a threshold number.

3. The method of claim 1, further comprising determining an image quality associated with each image of the image sequence, wherein recording of each image of the image sequence is performed based on the image quality of a preceding image of the sequence exceeding a threshold quality.

4. The method of claim 1, wherein the set of auxiliary sensor signals comprises a non-visual identification signal.

5. The method of claim 4, wherein the non-visual identification signal comprises driver login information received at a client application executing on a mobile device associated with the vehicle driver.

6. The method of claim 1, wherein detecting the sampling event comprises detecting a start time point of the driving session.

7. The method of claim 6, wherein detecting the start time point of the driving session comprises detecting a pattern of vehicle door opening and vehicle door closing at a sensor of the vehicle system.

8. The method of claim 1, wherein the set of auxiliary sensor signals comprises a set of historical data associated with past driving sessions.

9. The method of claim 8, wherein the set of historical data comprises a most recent previous driver identifier determined prior to the driving session.

10. The method of claim 8, wherein the set of historical data comprises a most frequent driver identifier determined in association with the past driving sessions.

11. A method for driver identification comprising:
   recording a first image of a vehicle driver at an interior-facing camera of a vehicle system during a driving session;
   computing a first probability that the vehicle driver is associated with a driver identifier based on the first image;
   in response to the first probability falling below a first threshold value, recording a second image of the vehicle driver, and recomputing the first probability that the vehicle driver is associated with the driver identifier based on the first image and the second image;
   in response to the first probability exceeding the first threshold value, transmitting the first and second images to a remote computing system;
   extracting a feature vector from the first and second images at a feature extraction module of the remote computing system;
   determining a set of auxiliary sensor signals;
   computing a second probability that the vehicle driver is associated with the driver identifier based on the feature vector in combination with the set of auxiliary sensor signals;
   associating the driver identifier with the driving session based on the second probability;
   in response to the second probability exceeding a second threshold value, automatically associating the driving session with the driver identifier;
   in response to the second threshold value exceeding the second probability and the second probability exceeding a third threshold value, receiving a driver identification input from a user and associating the driving session with a user-selected driver identifier; and
   in response to the third threshold value exceeding the second probability, generating a new driver identifier corresponding to the feature vector in combination with the auxiliary sensor signal and associating the new driver identifier with the driving session.

12. The method of claim 11, wherein recording the first image is performed in response to detecting a sampling event.

13. The method of claim 12, wherein detecting the sampling event comprises detecting a start time point of the driving session.

14. The method of claim 13, wherein detecting the start time point of the driving session comprises detecting a user interaction between the vehicle driver and a mobile device associated with the vehicle driver and in communication with the vehicle system.

15. The method of claim 11, wherein the set of auxiliary sensor signals comprises a set of historical data associated with past driving sessions.

16. The method of claim 15, wherein the set of historical data comprises a most recent previous driver identifier determined prior to the driving session.

17. The method of claim 15, wherein the set of historical data comprises a most frequent driver identifier determined in association with the past driving sessions.

18. The method of claim 11, wherein the set of auxiliary sensor signals comprises a biometric signal received from the vehicle driver.

19. The method of claim 11, wherein the set of auxiliary sensor signals comprises a beacon signal received at the vehicle system from a mobile device associated with the vehicle driver.

* * * * *